(12) United States Patent
Durairaj et al.

(10) Patent No.: US 7,074,861 B2
(45) Date of Patent: Jul. 11, 2006

(54) MODIFIED RESORCINOL RESINS AND APPLICATIONS THEREOF

(75) Inventors: Raj Durairaj, Monroeville, PA (US); Mark A. Lawrence, New Kensington, PA (US)

(73) Assignee: INDSPEC Chemical Corporation, Pittsburgh, PA (US)

( * ) Notice: Subject to any disclaimer, the term of this patent is extended or adjusted under 35 U.S.C. 154(b) by 151 days.

(21) Appl. No.: 10/368,753

(22) Filed: Feb. 18, 2003

(65) Prior Publication Data

US 2004/0162391 A1   Aug. 19, 2004

(51) Int. Cl.
*C08G 14/02* (2006.01)
*C08L 61/00* (2006.01)

(52) U.S. Cl. ............... 525/502; 525/68; 525/137; 525/138; 525/139; 528/135; 528/143; 528/144; 528/153; 528/155

(58) Field of Classification Search .......... 525/68, 525/137, 138, 139, 502; 528/138, 143, 144, 528/153, 155
See application file for complete search history.

(56) References Cited

U.S. PATENT DOCUMENTS

| 1,370,666 | A |   | 3/1921  | Novotny |
|-----------|---|---|---------|---------|
| 1,598,546 | A |   | 8/1926  | Baekeland et al. |
| 2,131,249 | A |   | 9/1938  | Balle |
| 2,173,346 | A |   | 9/1939  | Turkington et al. |
| 2,176,951 | A |   | 10/1939 | Bannister et al. |
| 2,231,860 | A |   | 2/1941  | Swallen |
| 3,728,192 | A |   | 4/1973  | Kindle et al. |
| 3,751,331 | A |   | 8/1973  | Dane et al. |
| 4,889,891 | A |   | 12/1989 | Durairaj et al. |
| 5,021,522 | A |   | 6/1991  | Durairaj et al. |
| 5,049,641 | A |   | 9/1991  | Hood et al. |
| 5,412,058 | A |   | 5/1995  | Dreyfus et al. |
| 5,426,152 | A |   | 6/1995  | Hesse et al. |
| 5,847,058 | A | * | 12/1998 | Teodorczyk ............... 525/480 |
| 6,265,490 | B1 |  | 7/2001  | Morel-Fourrier et al. |

FOREIGN PATENT DOCUMENTS

| EP | 0 019 151 A1 |   | 11/1980 |
|----|--------------|---|---------|
| EP | 419741 A1    | * | 4/1991  |
| GB | 1069983      |   | 5/1967  |
| GB | 1448374      |   | 9/1967  |
| GB | 1 448 374    |   | 9/1976  |

OTHER PUBLICATIONS

PCT Notification of Transmittal of International Preliminary Report of Patentability (PCT Rule 71.1), PCT/US2004/004428 dated Jan. 13, 2005.

* cited by examiner

*Primary Examiner*—Jeffrey B. Robertson
(74) *Attorney, Agent, or Firm*—Jones Day

(57) ABSTRACT

A modified resorcinol resin is prepared by reacting a phenolic compound (e.g., resorcinol) with an olefinically unsaturated compound (e.g., styrene) and two types of aldehyde: a formaldehyde and an alkyl aldehyde (e.g., butyraldehyde). The reaction is typically carried out in the presence of an acid catalyst. The resulting resin has a lower softening point and can be used as a methylene acceptor compound in a vulcanizable rubber composition.

55 Claims, 8 Drawing Sheets where R = H or alkyl where R = H or n-butyl where R = H or iso-propyl

MODIFIED RESORCINOL RESINS AND APPLICATIONS THEREOF

PRIOR RELATED APPLICATIONS

Not applicable.

FEDERALLY SPONSORED RESEARCH STATEMENT

Not applicable.

REFERENCE TO MICROFICHE APPENDIX

Not applicable.

FIELD OF THE INVENTION

The invention relates to resorcinolic novolak resins obtained by condensation with aldehydes, methods for their synthesis and applications thereof, especially in the formulation of rubber compositions.

BACKGROUND OF THE INVENTION

In the manufacture of reinforced rubber products, such as automobile tires, it is important to have good adhesion between the rubber and the reinforcing material. Originally, adhesion of the rubber to the reinforcing material was promoted by pretreating the reinforcing material with certain adhesives. This proved unsatisfactory and it is now conventional to incorporate into the rubber during compounding various chemicals that react to improve the adhesion of the reinforcing materials and rubber. This compounding adhesion method is now generally practiced regardless of whether the reinforcing materials are pretreated with adhesives.

The conventional method of compounding adhesion comprises compounding into the rubber before vulcanization a two part adhesive system. One part is a methylene donor compound that generates formaldehyde upon heating. The other part of the adhesive system is a methylene acceptor compound. During the vulcanization step the methylene donor upon heating releases formaldehyde and the methylene acceptor reacts with the formaldehyde, rubber and reinforcing material with a resultant increase in adhesion of the rubber to the reinforcing materials. In addition, proper selection of the methylene donor and methylene acceptor can improve many other properties of the final product. The methylene donor and the methylene acceptor are compounded into the rubber and thus have a significant effect on the process of making the reinforced rubber product.

Many different methylene acceptor compounds have been tried with various degrees of commercial success. Examples of the most common methylene acceptor compounds are resorcinol, resorcinol formaldehyde novolak resins, phenol formaldehyde novolak resins and phenol resorcinol formaldehyde novolak resins. Pure resorcinol is used in combination with methylene donors, such as hexamethylenetetramine ("HEXA") or hexamethoxymethylmelamine (HMMM). The resins condensed in this manner increase the strengthening effect and improve the interfacial adhesion while at the same time providing increased rigidity of the rubber blend and improved wear resistance of the tread under a wide range of stress conditions. However, the use of resorcinol alone presents health and environmental protection problems because resorcinol may fume under the rubber processing conditions. In contrast to free resorcinol, resorcinol formaldehyde novolak resins release substantially less vapors and are used in combination with HMMM, although they are less effective for the adhesion than free resorcinol. At the same time, the stress values and especially the Shore A hardness of the strengthened rubber blends modified with such resorcinol novolaks are substantially less than those achieved when free resorcinol is used. Furthermore, owing to the strong natural color, resorcinol-formaldehyde resins cannot be used in those rubber blends intended for applications in which a pale color of the vulcanized rubber is required. Another concern is the processability of the rubber compound. Adding a methylene acceptor, such as a resorcinol-formaldehyde resin, and a methylene donor, such as HMMM, to a rubber compound tend to increase the viscosity of the uncured rubber compound, and thus the processability is decreased.

Therefore, there is a need for resorcinol resins that do not produce volatiles such as resorcinol at Banbury mixing temperatures, are not hygroscopic and do not bloom. Furthermore, there is a need for resorcinol resins for rubber compounding which yield good processability without sacrificing other desired performance properties.

SUMMARY OF THE INVENTION

Embodiments of the invention meet the aforementioned needs in one or more of the following aspects. In one aspect, the invention relates to a modified resorcinol resin and a process for making it. The process comprises reacting a phenolic compound with (1) an olefinically unsaturated compound selected from the group consisting of styrene, α-methyl styrene, p-methyl styrene, α-chloro styrene, divinyl benzene, vinyl naphthalene, indene, and vinyl toluene, and (2) formaldehyde and (3) with an alkyl aldehyde having at least 4 carbon atoms, wherein the molar ratio of the phenolic compound to the formaldehyde is from about 1:0.2 to about 1:0.4, the molar ratio of the phenolic compound to the alkyl aldehyde is from about 1:0.2 to about 1:0.45, and the molar ratio of the alkyl aldehyde to formaldehyde is from about 0.5:1 to about 2:1.

In some embodiments, the phenolic compound is represented by formula (1)

wherein $R_1$, and $R_2$ are independently selected from the group consisting of H, OH, $NH_2$, alkyl of 1–12 carbon atoms, $OCOR_3$ or $OR_3$ where $R_3$ is an alkyl or aryl group of 1–12 carbon atoms. For example, the phenolic compound can be a resorcinol; the olefinically unsaturated compound can be a styrene; the alkyl aldehyde can be a n-butyraldehyde or isobutyraldehyde. The alkyl aldehyde can also be a valeraldehyde, lauryl aldehyde, palmityl aldehyde, or stearyl aldehyde. In certain processes, the molar ratio of the phenolic compound to the olefinically unsaturated compound is from about 1:0.65 to about 1:0.55. The molar ratio of the alkyl aldehyde to formaldehyde is from about 0.9:1 to about 1.5:1. The molar ratio of the alkyl aldehyde to formaldehyde is from about 1:1 to about 1.2:1. In some instances, the resulting resorcinol resin has a free resorcinol content of less than 5 weight percent and/or has a softening point between about 90° C. and about 105° C. In certain processes, the reaction occurs in the presence of an acid catalyst. The acid catalyst can be selected from the group consisting of benzene sulfonic acid, benzene disulfonic acid, p-toluene sulfonic acid; xylene sulfonic acid, and methane sulfonic acid.

In other embodiments, the modified resorcinol resin is prepared by reacting resorcinol, styrene, formaldehyde and butyraldehyde, wherein the molar ratio of resorcinol to styrene is from about 1:0.65 to about 1:0.60, the molar ratio of resorcinol to formaldehyde is from about 1:0.4 to about 1:0.2, the molar ratio of resorcinol to butyraldehyde is from about 1:0.45 to about 1:0.2, and the molar ratio of butyraldehyde to formaldehyde is from about 0.9:1 to about 1.2:1.

In another aspect, the invention relates to a resorcinol resin comprising a structure represented by the following formula:

FIG. 2 is a reaction scheme for making a resorcinol-styrene-alkyl aldehyde-formaldehyde resin in accordance with embodiments of the invention.

FIG. 3 is a reaction scheme for making a resorcinol-styrene-n-butyraldehyde resin in accordance with one embodiment of the invention.

FIG. 4 is a reaction scheme for making a resorcinol-styrene-n-butyraldehyde-formaldehyde resin in accordance with another embodiment of the invention.

FIG. 5 is a reaction scheme for making a resorcinol-styrene-n-valeraldehyde resin in accordance with yet another embodiment of the invention.

FIG. 6 is a reaction scheme for making a resorcinol-styrene-n-valeraldehyde-formaldehyde resin in accordance with still another embodiment of the invention.

FIG. 7 is a reaction scheme for making a resorcinol-styrene-iso-butyraldehyde resin in accordance with one embodiment of the invention.

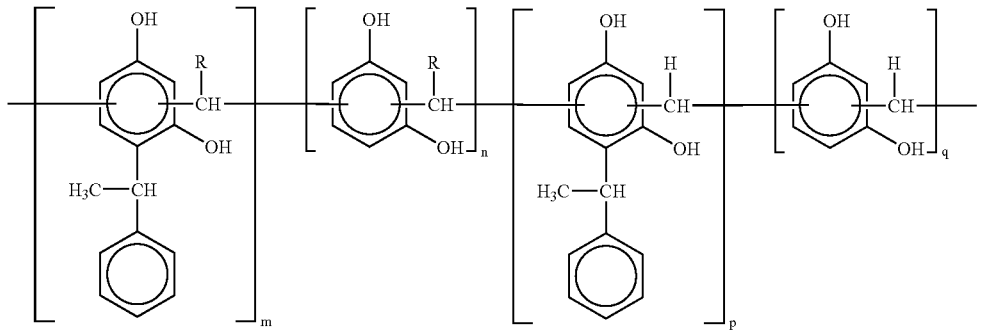

wherein R is an alkyl, aryl, or aralkyl having at least 3 carbon atoms; m and n are independently a positive integer, p and q are independently zero or a positive integer, where the sum of m, n, p, and q is at least 3. In some embodiments, (m+n)/(p+q) is between about 0.5:1 and about 2:1; m and n independently range from about 1 to about 100; p and q independently range from about 1 to 50. In other embodiments, R is propyl, isopropyl, or an aliphatic alkyl having at least 4 carbon atoms.

In yet another aspect, the invention relates to a modified resorcinol resin made by any of the above-described processes. In still another aspect, the invention relates to a vulcanizable rubber composition which comprises (I) a rubber component selected from natural rubber, synthetic rubber or combinations thereof, (II) a methylene donor compound which generates formaldehyde upon heating, and (III) a methylene acceptor compound comprising the modified resorcinol resin described herein. The methylene donor can be selected from the group consisting of hexamethylenetetramine, methylol melamines, etherified methylol melamines and esterified methylol melamines.

Additional aspects of the invention and characteristics and properties of various embodiments of the invention become apparent with the following description.

DESCRIPTION OF EMBODIMENTS OF THE INVENTION

Figure 1:
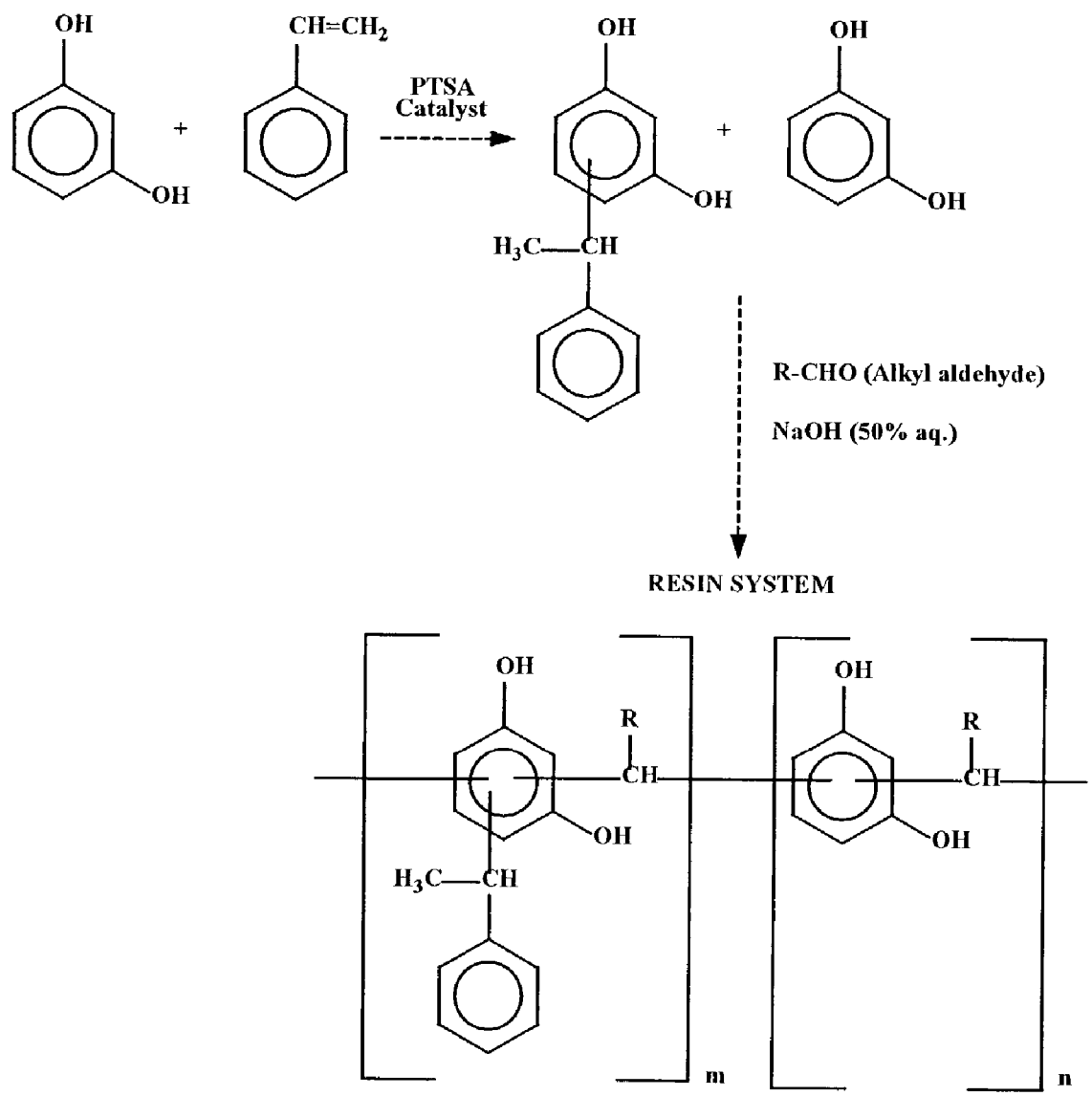
FIG. 1 is a reaction scheme for making a resorcinol-styrene-alkyl aldehyde resin in accordance with embodiments of the invention.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, RL and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a modified resorcinol resin for use in rubber compounding and a number of other applications. In some embodiments, the modified resorcinol resin comprises a polymeric structure represented by the following formula:

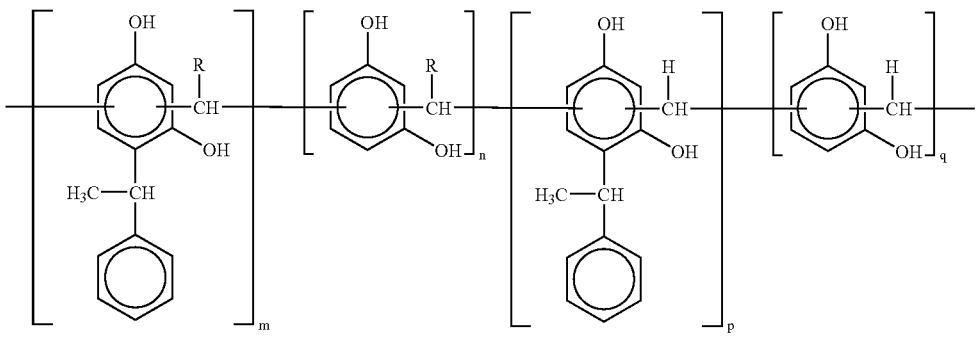

wherein R is an alkyl, aryl, or aralkyl having at least 3 carbon atoms; m and n are independently a positive integer, p and q are independently zero or a positive integer, where the sum of m, n, p, and q is at least 3. In some embodiments, m, n, p, and q independently can be from about 1 to 100, or from about 2 to about 10, or from about 5 to 50, and the ratio of (m+n) to (p+q) can vary from about 0.5:1 to about 2:1. It should be noted that the four different repeating units illustrated above are randomly distributed in the polymeric backbone. In other words, the modified resin is not a block copolymer, but a random copolymer.

The modified resorcinol resin can be prepared or obtained by reacting or contacting a phenolic compound, and an olefinically unsaturated compound with two kinds of aldehyde: formaldehyde and an aldehyde with at least four carbon atoms. It is found that the incorporation of a long chain aldehyde results in better processability during rubber compounding without sacrificing other desired properties, such as adhesion properties, dynamic mechanic properties, tensile properties, etc.

Suitable phenolic compounds are generally represented by the following formula (1):

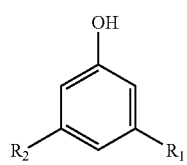

(1)

wherein $R_1$ and $R_2$ are independently selected from the group consisting of H, OH, $NH_2$, alkyl of 1–12 carbon atoms, $OCOR_3$ or $OR_3$ where $R_3$ is an alkyl or aryl group of 1–12 carbon atoms. Preferably, $R_2$ is OH; and $R_2$ is H or $C_{1-10}$ alkyl, such as methyl, ethyl, propyl, butyl, pentyl, hexyl, etc. Suitable phenolic compounds also include, but are not limited to, monohydric phenols, polyhydric phenols, mononuclear phenols, or polynuclear phenols. Examples of the phenolic compounds include, but are not limited to, phenol, cresol, xylenols having two hydrogen atoms in the ortho- and/or para-positions to the hydroxy group, butylphenol, α-naphthol, β-naphthol, resorcinol, diphenylolmethane, and diphenylolpropane. In some embodiments, resorcinol is used as the phenolic compound. In other embodiments, phenol is used as the phenolic compound. Specific examples of suitable phenols include, but are not limited to, unsubstituted phenol, m-cresol, p-cresol, 3.5-xylenol, 3.4-xylenol, 2.3.4-trimethyl phenol, 3-ethyl phenol, 3.5 diethyl phenol, p-butyl phenol, 3.5-dibutyl phenol, p-amyl phenol, p-cyclohexyl phenol, p-octyl phenol, 3.5 dicyclohexyl phenol, p-phynyl phenol, p-crotyl phenol, 3.5-dimethoxy phenol, 3.4.5-trimethoxy phenol, p-ethoxy phenol, p-butoxy phenol, 3-methyl-4-methoxy phenol, and p-phenoxy phenol.

Suitable olefinically unsaturated compounds include, but are not limited to, vinyl aromatics generally represented by the following formula (2):

$R_4$—CH=$CH_2$ (2)

wherein $R_4$ is phenyl, substituted phenyl, or other aromatic group. Examples of suitable olefinically unsaturated compounds include, but are not limited to, styrene, α-methyl styrene, p-methyl styrene, α-chloro styrene, divinyl benzene, vinyl naphthalene, indene, and vinyl toluene. In some embodiments, styrene is used as the olefinically unsaturated compound. Typically, the molar ratio of the phenolic compound to the olefinically unsaturated compound is between about 1:0.4 to about 1:1. In some embodiments, the molar ratio is from about 1:0.5 to about 1:0.9, from about 1:0.55 to about 1:0.8, from about 0.6 to 0.7. In other embodiments, the molar ratio is between about 0.60 and about 0.65.

As mentioned above, at least two kinds of aldehyde are used in a condensation reaction with the phenolic compound and the olefinically unsaturated compound. The first kind is formaldehyde. The term "formaldehyde" also encompasses paraformaldehyde or any substance to splits off formaldehyde, such as trioxane.

The second kind of aldehyde is an aldehyde with at least 4 carbon atoms per molecule. One class of such aldehydes are represented by formula (3):

$R_5$—CH=O (3)

wherein $R_5$ is an alkyl, aryl, or aralkyl having at least 3 carbon atoms per group. For example, $R_5$ can be propyl, isopropyl, butyl, isobutyl, pentyl, isopentyl, hexyl, octyl, nonyl, decyl, benzyl, etc. In some embodiments, the second aldehyde is an alkyl aldehyde with at least 4 carbon atoms per molecule, such as n-butyraldehyde or isobutyraldehyde. In other embodiments, the second aldehyde is an alkyl aldehyde with at least 5, 6, 7, 8, 9, or 10 carbon atoms per molecule, such as valeraldehyde, laurylaldehyde, palmitylaldehyde or stearylaldehyde. In some other embodiments, the second aldehyde is a mixture of two or more aldehydes as described above.

Generally, the molar ratio of phenolic compound to formaldehyde is from about 1:0.1 to about 1:0.6. Sometimes, the molar ratio is from about 1:0.2 to about 1:0.5, 1:0.25 to about 1:0.4, about 1:0.3 to about 1:0.4; or about 1:0.2 to about 1:0.4. The molar ratio of phenolic compound to the second aldehyde is from about 1:0.1 to about 1:0.7. Sometimes, the molar ratio is from about 1:0.2 to about 1:0.6, 1:0.25 to about 1:0.5, about 1:0.3 to about 1:0.4; or about 1:0.2 to about 1:0.4.5. Moreover, the molar ratio of phenolic compound to the total aldehyde is from about 1:0.2 to about 1:2. In some embodiments, the molar ratio is from about 1:0.3 to about 1:1.5, from about 1:0.4 to about 1:1.2; from about 1:0.5 to about 1:1. In other embodiments, the molar ratio is about 1:0.6, about 1:0.7, about 1:0.8 or about 1:0.9. The molar ratio of the second aldehyde to the formaldehyde can vary from about 0.25:1 to about 3:1. In some embodiments, the molar ratio is from about 0.35:1 to about 2.5:1; from about 0.5:1 to about 2:1; from about 0.6:1 to about 1.8:1; from about 0.7:1 to about 1.7:1, from about 0.8:1 to about 1.6:1; from about 0.9:1 to about 1.5:1; or from about 1:1 to about 1.2:1.

The modified resorcinol resins in accordance with embodiments of the invention should have at least 10 mole percent of the phenolic groups aralkylated with one or more olefinically unsaturated compounds, such as styrene, α-methyl styrene, p-methyl styrene, α-chloro styrene, divinyl benzene and vinyl naphthalenes. The modified resorcinol resins may have from 10 to 100 mole percent of the phenolic groups aralkylated. It is also possible to have two aralkyl groups on some of the phenolic groups. It is preferred that from 25 to 75 mole percent of the phenolic groups be aralkylated and that the phenolic groups are only mono-aralkylated. The exact amount of aralkyl groups is dictated by the desired properties of the final product. For example, high amounts of aralkyl groups may lower the softening point to an unacceptable level. The amount of aralkylation is chosen to give a softening point between 80 and 150° C., preferably between 80 and 120° C. The amount of aralkylation is also chosen to maximize the adhesion of the rubber to reinforcing material, and other properties such as the reactivity of the resorcinol resin with the methylene donor, the reactivity of the resorcinol resin to the double bonds in the rubber, the amount of fuming, the amount of blooming and the characteristics of the vulcanized product, i.e., the stiffness, etc.

The aralkyl group may be reacted onto the resorcinol resin after the resorcinol resin has been prepared. Alternatively the phenolic compound of formula (1) may be first aralkylated and then alone or with additional phenolic compounds reacted with the aldehydes. It is also possible to simultaneously aralkylate part or all of the phenolic compound while reacting the same with the aldehydes. It is preferred to first aralkylate the phenolic compound and then react the aralkylated phenolic compound and additional phenolic compound with the aldehydes.

The aralkylation is carried out by reacting the phenolic compound of formula (1) with the desired amount of olefin. The reaction of the phenolic group and the unsaturated hydrocarbon can be carried out in the presence or absence of solvents. Sometimes solvents may be beneficial. Examples of suitable solvents include benzene, toluene, xylene, and ethylbenzene.

In order to be commercially feasible, the reaction of the unsaturated aryl containing hydrocarbon and the phenolic group should be catalyzed. Examples of suitable catalysts are Friedel Crafts catalysts or acid catalysts. The acid catalysts include the inorganic acids such as hydrochloric, sulfuric, phosphoric and phosphorous. The acid catalysts also include the alkyl and aryl sulfonic acids such as benzene sulfonic acid, benzene disulfonic acid, toluene sulfonic acid, xylene sulfonic acid and methane sulfonic acid. The preferred catalysts are the aryl sulfonic acid catalysts. The amount of catalyst is preferably in the range of 0.01 to 10 parts of catalyst per 100 parts of phenolic compound. The aralkylation is generally carried out at temperatures between 50° C. to 180° C.

In order to prepare the resorcinol resins, the phenolic compound is reacted with aldehydes. This reaction can take place before or after the phenolic compound is aralkylated. It is preferred that the reaction take place after aralkylation. The condensation reaction of the phenolic compound with the aldehydes may be carried out in the absence of a catalyst or in the presence of a catalyst. The preferred method is to carry out the reaction in the presence of conventional acid catalysts. Examples of suitable acids including preferred catalysts are set forth above. The reaction may preferably be carried out in the range of 50 to 200° C. The use of solvents is optional and suitable solvents are the same as set forth earlier.

In some embodiments, resorcinol and styrene are reacted at a molar ratio of 1 mole of resorcinol to 0.60 to 0.65 moles of styrene in presence of acid catalyst at about 120° C. Thereafter, butyraldehyde is added first at a molar ratio of 0.2 to 0.45; then formaldehyde is added at a molar ratio of 0.2 to 0.4 and reacted at about 100° C., after which the reaction product is dehydrated.

In other embodiments, resorcinol and formaldehyde are reacted at a molar ratio of 1 mole of resorcinol to 0.5 to 0.7 moles of the total aldehyde (i.e. formaldehyde and butyraldehyde) at about 100° C. The reaction product is then dehydrated at atmospheric pressure at 140° C. Styrene at a molar ratio of 0.60 to 0.65 is then added to complete the reaction at 140–150° C. Both reactions are run in the presence of suitable acid catalysts.

FIGS. 1–8 are the reaction schemes for the condensation reactions described above. FIG. 1 illustrates the reaction of resorcinol, styrene, and an aldehyde. Generally, molten resorcinol and an acid catalyst, such as p-toluene sulfonic acid, are charged to a reactor. After 10 minutes of mixing the resorcinol and catalyst, styrene is added streamwise for a period of from ¾ to 1¾ hours while the temperature is maintained between about 120° C. to about 140° C. After all the styrene has been added, the temperature is maintained at 102° C.–140° C. for about ½ hour. The aldehyde is then added to the reactor streamwise over a period of 2 to 2½ hours. The reaction is exothermic and controlled by the rate of aldehyde addition. The reactor temperature is preferably kept at between about 100° C.–120° C., and it should not exceed 135° C. After all the aldehyde is added, the mixture is held at reflux for 15 to 45 minutes. Sometimes, the aldehyde is added in two stages as taught in U.S. Pat. No. 5,021,522. For each mole of resorcinol used, about 0.08 mole of sodium hydroxide is then charged to the reactor. Atmosphere distillation is conducted until a temperature of 145° C. is reached. The resin obtained this way may have a polymeric structure represented FIG. 1. In the Figure, R is an alkyl, aryl, or aralkyl having at least 3 carbon atoms; m and n are independently a positive integer of at least one, where the sum of m and n is at least 3. In some cases, m and n independently can be from about 1 to 100, or from about 2 to about 10, or from about 5 to 50. It should be noted that the four different repeating units illustrated above are randomly distributed in the polymeric backbone. In other words, the modified resin is not a block copolymer, but a random copolymer.

Figure 2:
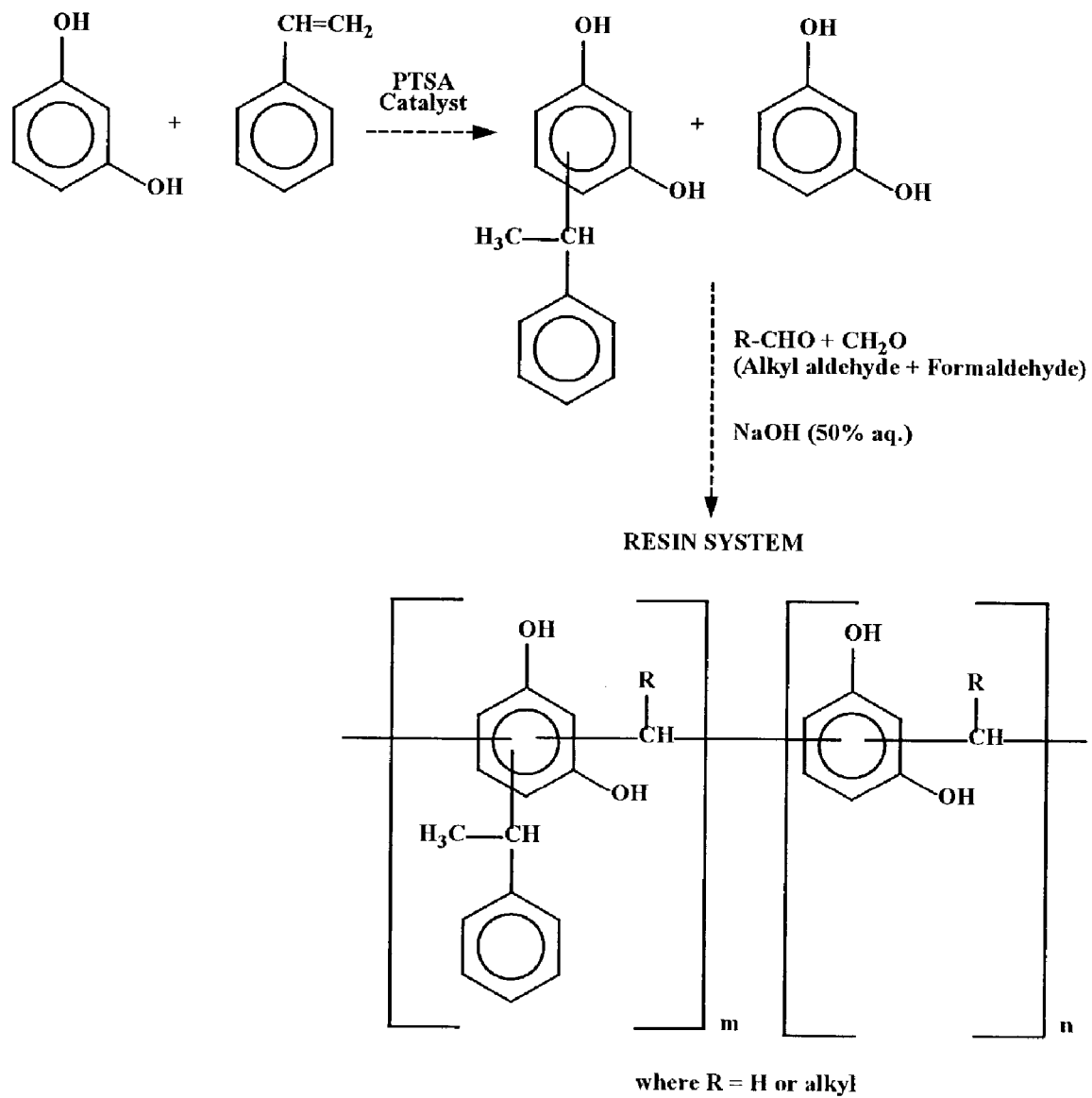

FIG. 2 is a reaction scheme for resorcinol, styrene, formaldehyde, and alkyl aldehyde. The condensation reaction can be carried out in a similar fashion as described above, except that two types of aldehydes are added. The formaldehyde and alkyl aldehyde can be added simultaneously or sequentially. The resulting resin may have a polymeric structure as shown in FIG. 2. In the Figure, m and n are independently a positive integer of at least one, where the sum of m and n is at least 3. In some cases, m and n independently can be from about 1 to 100, or from about 2 to about 10, or from about 5 to 50. In other cases, the ratio of m to n varies from about 0.5:1 to about 2:1. R is an alkyl, aryl, or aralkyl having at least 3 carbon atoms. Preferably, R is an aliphatic alkyl with at least 3 carbon atoms, such as isopropyl, propyl, butyl, isobutyl, pentyl, etc. It should be emphasized that while FIG. 2 shows two blocks within the polymeric structure, the resin is not necessarily an alternating block copolymer. It can be a random copolymer with the repeating units formed by resorcinol (styrenated or un-styrenated) and alkyl aldehyde and the repeating units formed by resorcinol (styrenated or un-styrenated) and formaldehyde randomly distributed throughout the polymer chain. As indicated in FIG. 2, each R in the polymeric structure independently can be hydrogen or an alkyl group.

Figure 3:
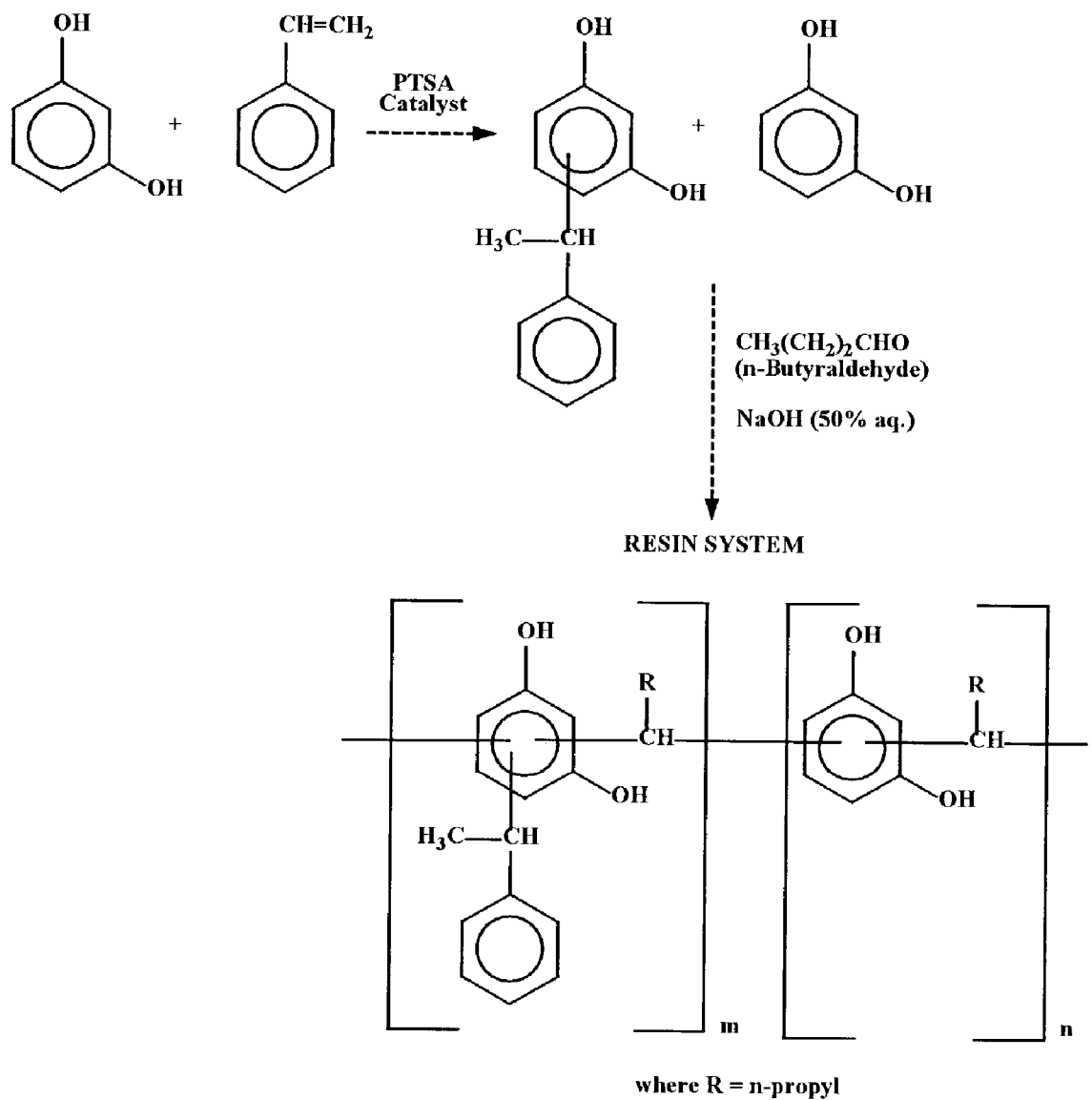
Figure 4:
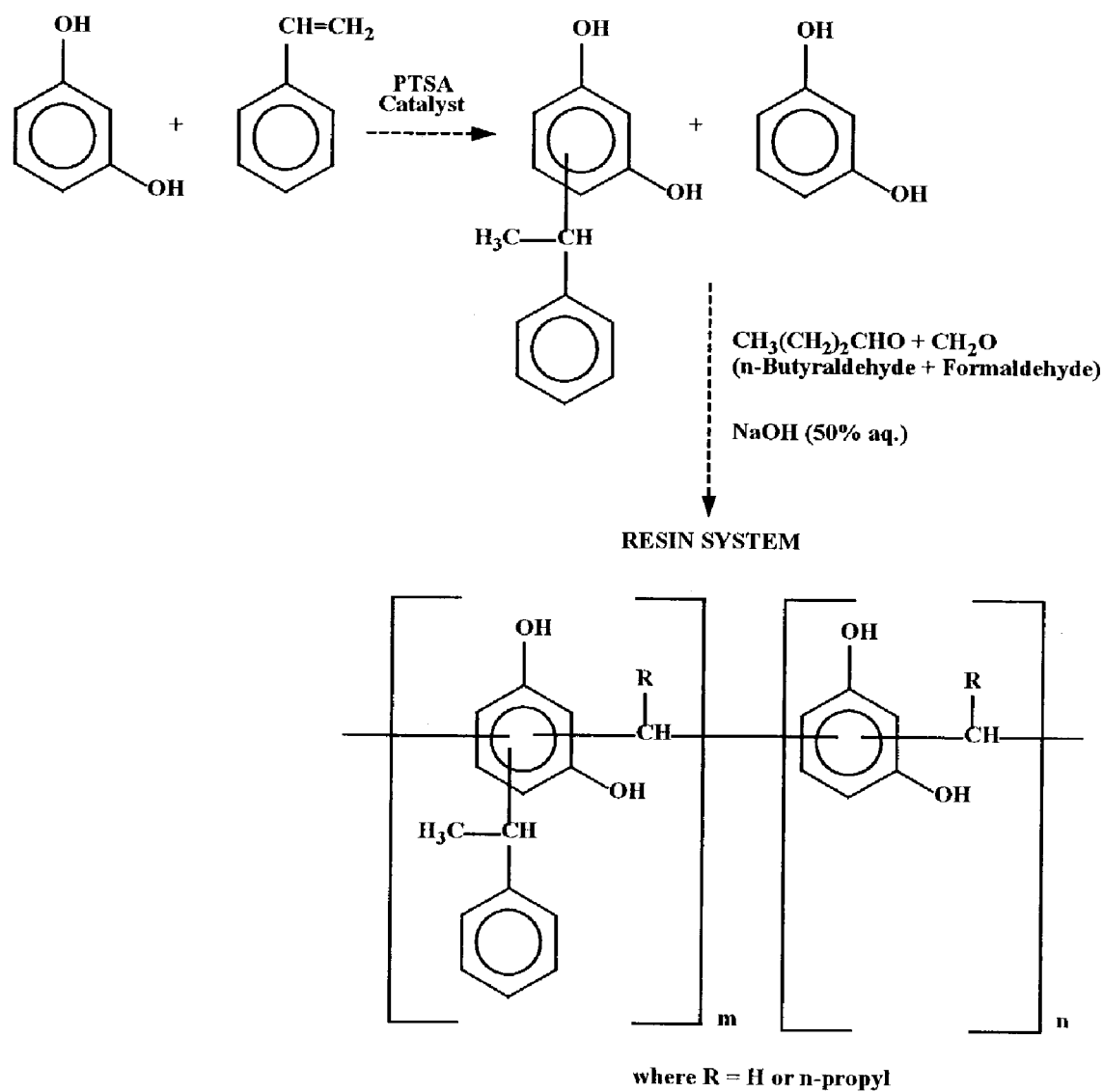
Figure 5:
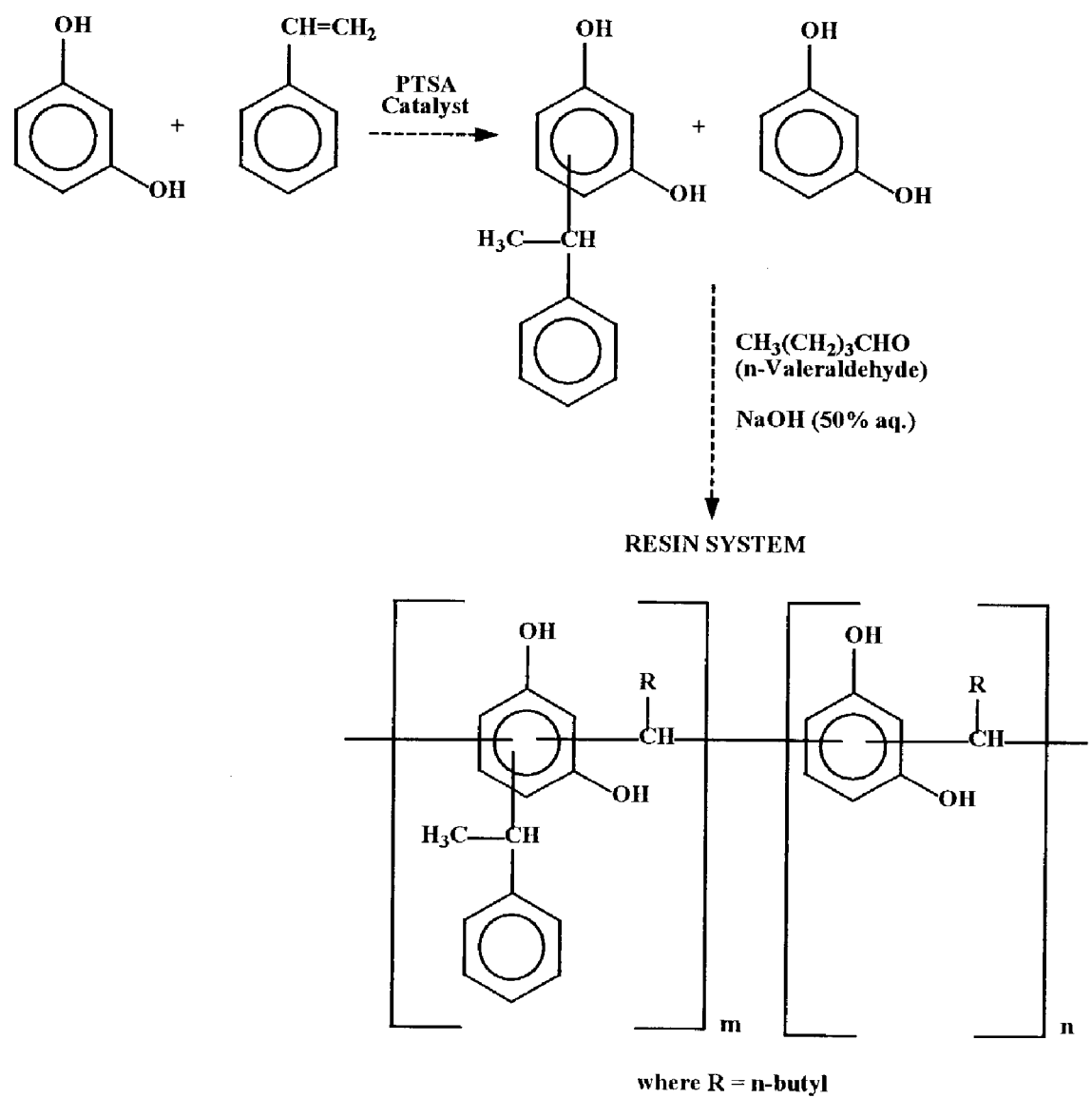
Figure 6:
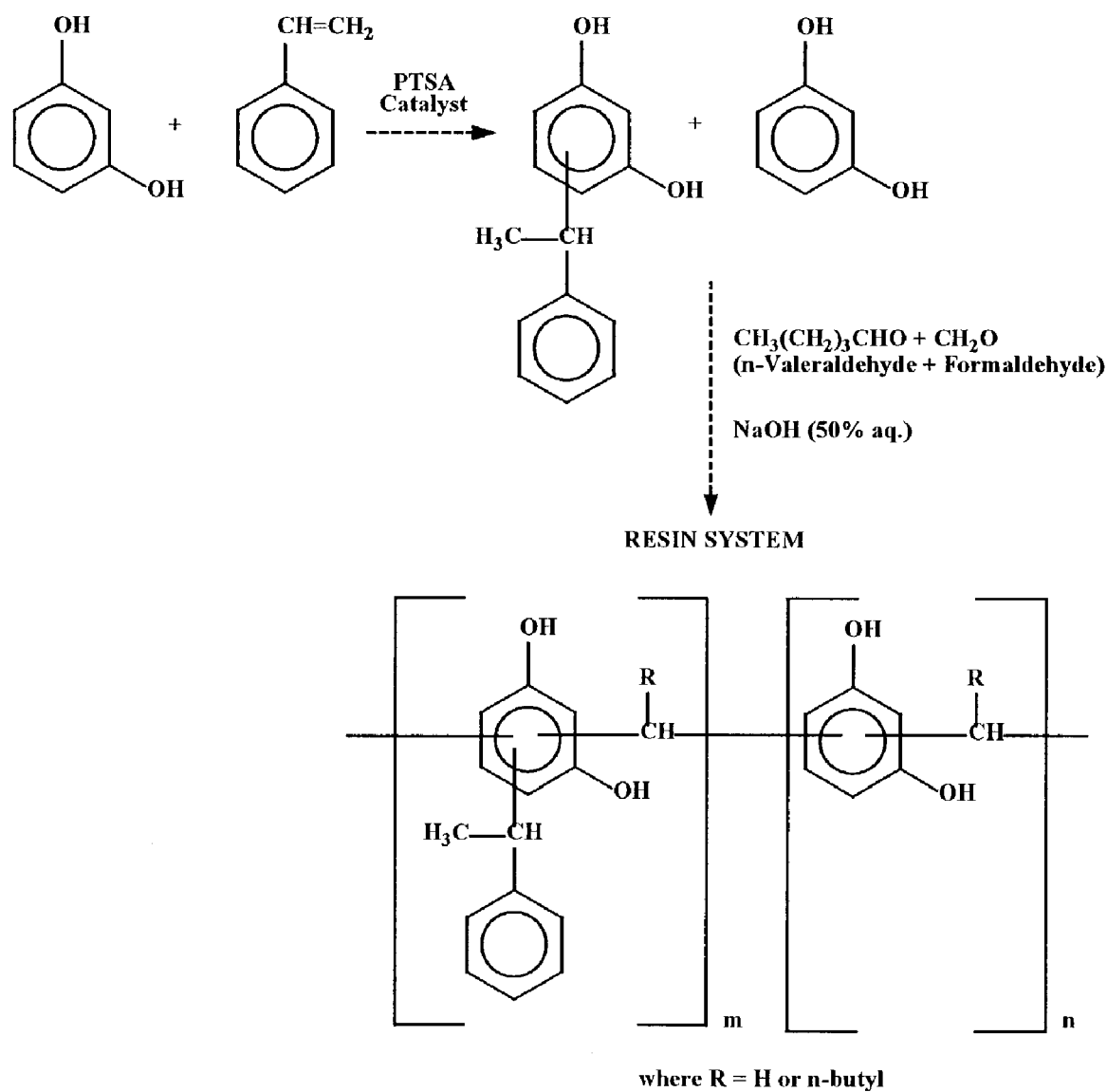
Figure 7:
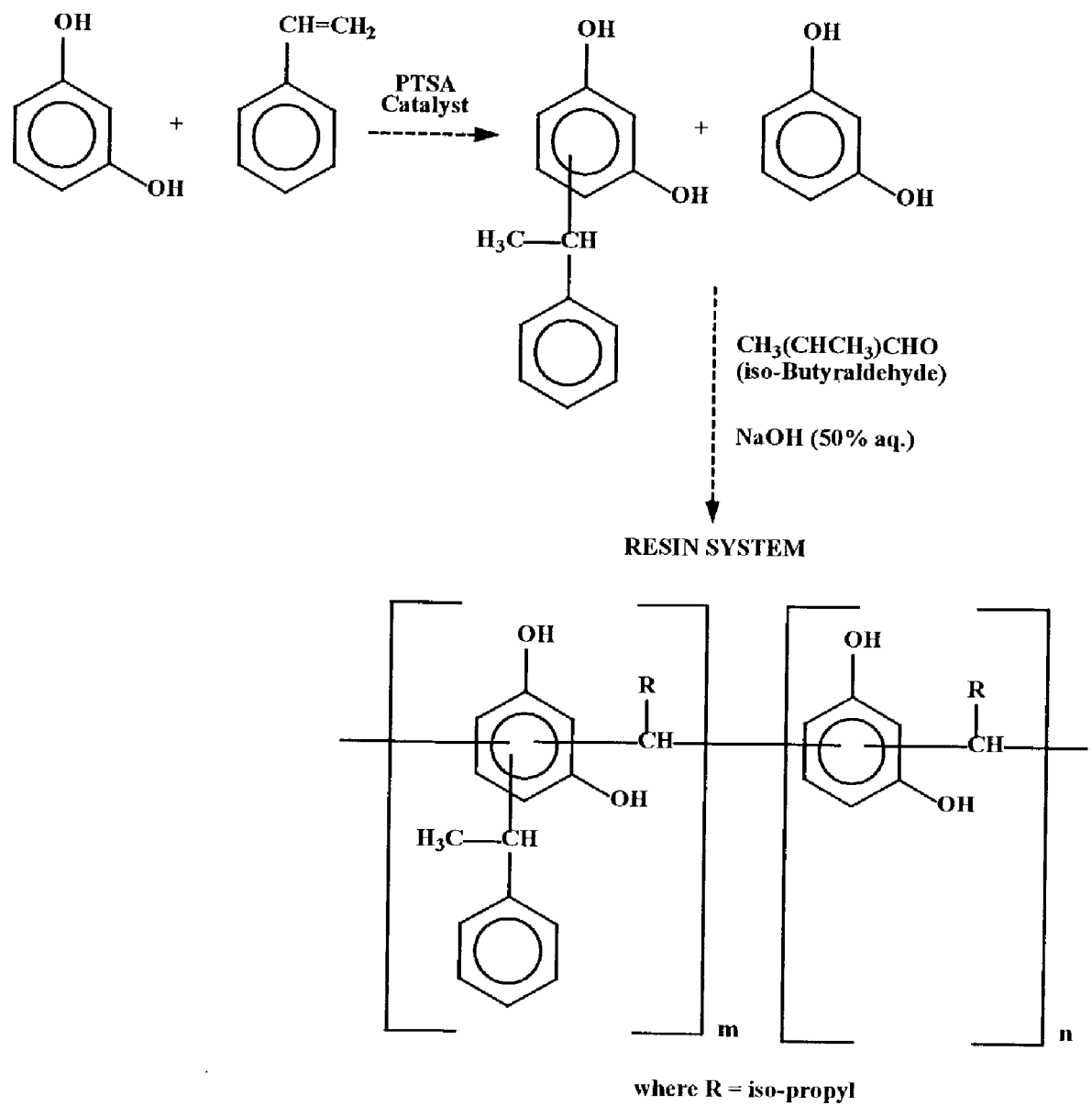
Figure 8:
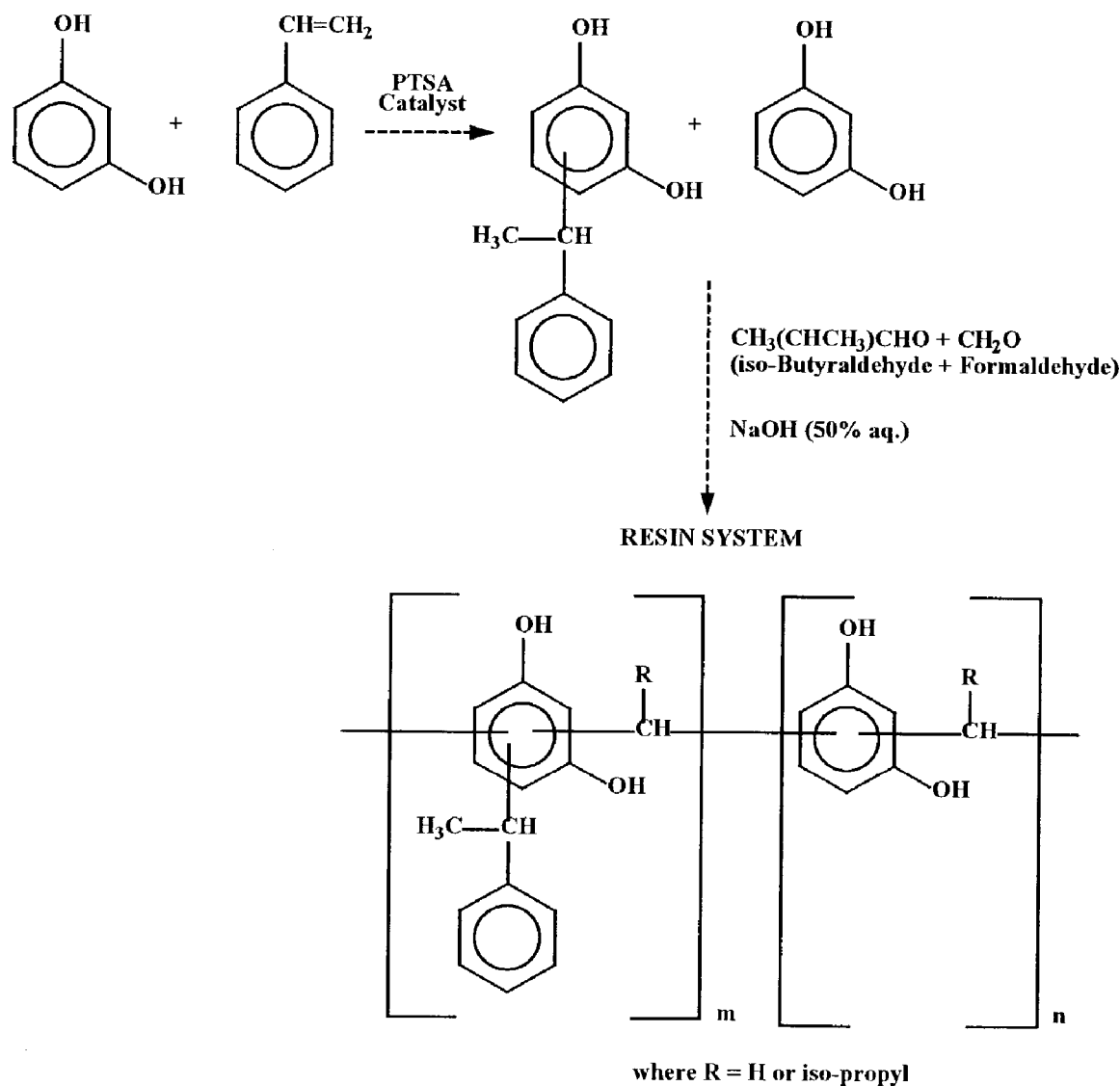
FIG. 8 is a reaction scheme for making a resorcinol-styrene-iso-butyraldehyde-formaldehyde resin in accordance with another embodiment of the invention.

FIGS. 3, 5, and 7 illustrate the condensation reaction of resorcinol, styrene, and an alkyl aldehyde, such as n-butyraldehyde, valeraldehyde, or isobutyraldehyde. FIGS. 4, 6, and 8 illustrate the condensation reaction of resorcinol, styrene, formaldehyde, and an alkyl aldehyde, such as n-butyraldehyde, valeraldehyde, or isobutyraldehyde. These reactions can be carried out in a similar way as described above. It should be noted that other methods may exist for making the modified resorcinol resins. For example, the modified resorcinol resins may be made by the methods disclosed in the following U.S. patents with or without modifications: U.S. Pat. Nos. 1,598,546; 2,131,249; 2,173,346; 2,176,951; 3,728,192; 5,021,522; 5,412,058; and 6,265,490, which are incorporated by reference herein in their entirety.

As mentioned above, a vulcanizable rubber composition can be prepared by using the modified resorcinol resin as the methylene acceptor. The vulcanizable rubber composition comprises: (I) a rubber component selected from natural and synthetic rubbers; and (II) a methylene donor compound which generates formaldehyde by heating; and (III) a methylene acceptor which is based on the modified resorcinol resin described herein. Optionally, the rubber composition may further comprise (IV) a vulcanizing agent, such as sulfur; and (V) one or more rubber additives.

The rubber component can be any natural rubber, synthetic rubber or combination thereof. Specific examples of synthetic rubbers include neoprene (polychloroprene), polybutadiene, polyisoprene, butyl rubber, copolymers of 1,3-butadiene or isoprene with monomers such as styrene, acrylonitrile and methyl methacrylate as well as ethylene/propylene/diene monomer (EPDM) and in particular ethylene/propylene/dicyclopentadiene terpolymers.

The methylene donor component can be any compound that generates formaldehyde upon heating during the vulcanization and capable of reacting with the methylene acceptor used in the rubber compound formulations. Examples of suitable methylene donors include, but are not limited to, hexamethylenetetramine (HEXA or HMT) and hexamethoxymethylmelamine (HMMM). Other suitable methylene donors are described in U.S. Pat. No. 3,751,331, which is incorporated by reference herein in its entirety. The methylene donor is usually present in concentrations of from about 0.5 to 15 parts per one hundred parts of rubber, preferably from 0.5 to 10 parts per one hundred parts of rubber. The weight ratio of methylene donor to methylene acceptor may vary. But, in general, the weight-ratio will range from 1:10 to 10:1. Preferably, the weight ratio of methylene donor to methylene acceptor ranges from 1:3 to 3:1.

The vulcanizable rubber composition may include a vulcanizing agent, such as sulfur. Examples of suitable sulfur vulcanizing agents include elemental sulfur or sulfur donating vulcanizing agents. Preferably, the sulfur vulcanizing agent is elemental sulfur.

The vulcanizable rubber composition may also include one or more of additives used in rubber compositions. The additives commonly used in the rubber stocks include carbon black, cobalt salts, stearic acid, silica, zinc oxide, fillers, plasticizers, waxes, processing oils retarders, antiozonants and the like.

Accelerators are also used to control the time and/or temperature required for the vulcanization and to improve the properties of the vulcanizate. Suitable accelerators include, but are not limited to, amines, disulfides, guanidines, thioureas, thiazoles, thiurams, sulfenamides, dithicarbonates and zanthates. Preferably, the primary accelerator is a sulfenamide.

The rubber compositions based on the above resins may be used in the preparation of composite products for the manufacture of tires, power belts, conveyor belts, printing rolls, rubber shoe heels and soles, rubber wringers, automobile floor mats, mud flaps for trucks, ball mill liners, and the like. The rubber compound described herein also may be used as a wire coat or bead coat for use in the tire applications. Any form of the cobalt compounds known in the art to promote the adhesion of rubber to metal, such as stainless steel, may be used. Suitable cobalt compounds which may be employed include cobalt salts of fatty acids such as stearic acid, palmitic, oleic, linoleic and the like; cobalt salts of aliphatic or alicyclic carbocylic acids having 6 to 30 carbon atoms; cobalt chloride, cobalt naphthenate, cobalt neodeconoate, and an organo-cobalt-boron complex commercially available under the trade name Monobond C.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

In the following examples, various methylene acceptor resins were prepared and evaluated in a black natural rubber compound to assess and compare their performance against resorcinol for steel-wire adhesion and cured rubber compound dynamic properties. Black natural rubber compositions, having the formulation shown in the following table, were prepared in a 3-stage mixing procedure. These rubber compositions were then used to evaluate the adhesion and reinforcing effects of the resorcinol compounds of this invention as methylene acceptors in combination with the methylene donor hexamethoxymethylmelamine (HMMM). The methylene donor/acceptor ratio was kept at 1:1 for resorcinol and at 2:3 for the methylene acceptor of this invention with a combined loading of 5 parts by weight in the rubber compound.

| Rubber Compound Used in Testing | |
|---|---|
| Master Batch | Parts by Weight |
| First Stage | |
| 1. Natural Rubber | 100 |
| 2. Carbon Black | 55 |
| 3. Zinc Oxide | 8 |
| 4. Stearic Acid | 1 |
| 5. N-(1,2-Dimethylbutyl)-N'-Phenyl-p-Phenylene Diamine | 2 |

-continued

Rubber Compound Used in Testing

| Master Batch | Parts by Weight |
|---|---|
| 6. Pre-Vulcanization Inhibitor [N-(Cyclohexylthio) Phthalimide] | 0.2 |
| 7. Polymerized 1,2-Dihydro-2,2,4-Trimethyl Quinoline | 1 |
| Second Stage | |
| 8. Methylene Acceptor (Resorcinol/Resins) | 2.5/3 |
| 9. Cobalt Salt (Monobond 680C, 22% Co) | 0.45 |
| Third Stage (Final) | |
| 10. Insoluble Sulfur | 7.5 |
| 11. N,N-Dicylohexyl-2-Benzenethiazole Sulfenamide | 1 |
| 12. Methylene Donor (HMMM, 72% Active) | 2.5/2 |

The rubber masterbatch was mixed in the first stage to about 150° C. in a Banbury mixer. In a second stage, a methylene acceptor prepared according to the methods of this invention and a cobalt salt were mixed into an appropriate amount of masterbatch on the two-roll mill at about 121° C. The insoluble sulfur, accelerator and appropriate amount of HMMM as indicated in Table 1 were mixed in the third stage at 95° C. The test compounds were conditioned overnight in a constant temperature room at about 23° C. and 50% relative humidity. The compounds were then tested for Rheometer cure, and shaped and optimum cured at 150° C. for the evaluation of wire adhesion and mechanical properties.

Cure properties were measured with an Alpha Technologies MDR Rheometer at 150° C., 0.5° arc and 1.67 Hz according to ASTM D-5289. Wire pullout adhesion was determined for each test compound by ASTM D-2229 using brass plated steel cord with 63.7% copper plating embedded 19 mm into the rubber pad. Dynamic mechanical properties were determined with a Rheometrics Scientific mechanical spectrometer at 0.2 and 2% torsional shear strain at 1 Hz and 23° C. temperature. Dynamic stiffness G' was measured at 0.2% strain and tangent delta, an indicator of compound hysteresis or heat buildup, was measured at 2% strain.

The softening point of the resins was measured according to the following method with reference to the latest edition of ASTM E 28 and ASTM D 3104, which are incorporated by reference herein in their entirety.

Apparatus: cups—pitch type drilled to 0.257" Opening (F drill); a 440 stainless steel ball (0.2500" in diameter and must pass through cups); a Mettler softening point apparatus comprising (1) a control unit Model FP-90 or equivalent, (2) a furnace Model FP-83 or equivalent, and (3) cartridge assemblies; a timer; porcelain evaporating dishes (about 3" in diameter); and a hot plate. For calibration of the Mettler apparatus, see ASTM D 3104, which is incorporated by reference herein.

Procedures: melt 15 grams of resin in a porcelain or aluminum evaporating dish. At 600–650° F., surface temperature of hot plate, melting time is approximately 4 minutes. Overheating should be avoided. When the resin is melted, pour into cups that have been preheated to at least the temperature of the molten resin. The quantity of resin poured into the cups should be such that after solidification the excess can be removed with a heated spatula or putty knife. An aluminum plate with holes drilled in it to form a support on the sides and bottom of the cup can be used, or they can be held with forceps when removing excess resin. After the samples have been cooled to room temperature in a desiccator, assemble the cartridge so that the ball rests on the top of the resin. Place the assembled cartridge in the furnace, which has been preset to 85° C. or 10–15° C. below the expected soft point. Set the heating rate at 1° C./min. Turn the cartridge until it locks into position, and wait 30 seconds. Then, initiate operation of softening point apparatus. Read the completed softening point on the indicator. Duplicate determinations should not differ by more than 1.0° C.

EXAMPLE 1 (COMPARATIVE)

Synthesis of Styrene Modified Resorcinol-Formaldehyde Resin

Into a 3-liter reaction kettle equipped with a stirrer, thermometer, reflux condenser and an addition funnel, 660.6 grams (6.0 moles) of resorcinol were charged and heated to 120–130° C. p-Toluene sulfonic acid (2.4 grams) was then added at 120° C. and mixed for 5 minutes. Then 582.4 grams (5.6 moles) of styrene were added dropwise over a period of 60–120 minutes at 120–135° C. After all the styrene has been added, the reaction mixture was maintained at that temperature for an additional 30–60 minutes. Then 312.2 grams (3.84 moles) of 37% aqueous formaldehyde solution were added slowly into the kettle for a period of 45–60 minutes at 95–120° C. The reaction mixture was held at reflux for 30–60 minutes more. After the reflux, 1.2 grams of 50% sodium hydroxide solution were added to neutralize the acid catalyst. Finally water distillate was removed under reduced pressure to obtain a resin having a softening point of 110.1° C.

EXAMPLE 2 (COMPARATIVE)

Synthesis of Styrene Modified Resorcinol-Formaldehyde Resin

Into a 500 mL reaction kettle equipped with a stirrer, thermometer, reflux condenser and an addition funnel, 110 grams (1.0 mole) of resorcinol were charged and heated to 120–130° C. p-Toluene sulfonic acid (1.0 gram) was then added at 120° C. and mixed for 5 minutes. Then 104.2 grams (1.0 mole) of styrene were added dropwise over a period of 60–120 minutes at 120–135° C. After all the styrene had been added, the reaction mixture was maintained at that temperature for an additional 30–60 minutes. Then 56.8 grams (0.7 mole) of 37% aqueous formaldehyde solution were added slowly into the kettle for a period of 45–60 minutes at 95–120° C. The reaction mixture was held at reflux for 30–60 minutes more. After the reflux, 0.5 gram of 50% sodium hydroxide solution was added to neutralize the acid catalyst. Finally water distillate was removed under reduced pressure to obtain a resin having a softening point of 124.8° C.

EXAMPLE 3

Synthesis of Styrene Modified Resorcinol-Butyraldehyde Resin

Into a 500 mL reaction kettle equipped with a stirrer, thermometer, reflux condenser and an addition funnel, 110.1 grams (1.0 mole) of resorcinol were charged and heated to 120–130° C. p-Toluene sulfonic acid (1.0 gram) was then added at 120° C. and mixed for 5 minutes. Then 62.4 grams (0.6 mole) of styrene were added dropwise over a period of 60–120 minutes at 120–135° C. After all the styrene had been added, the reaction mixture was maintained at that temperature for an additional 30–60 minutes. After this, the temperature was raised to 150–155° C. and the contents were stirred for an additional 30 minutes to complete the resorcinol-styrene reaction. Then 46.8 grams (0.65 mole) of butyraldehyde were added slowly into the kettle for a period of 45–60 minutes at 90–120° C. The reaction mixture was held at reflux for 30–60 minutes more. After the reflux, 0.5 gram of 50% sodium hydroxide solution was added to neutralize the acid catalyst. Finally water distillate was removed under reduced pressure to obtain a resin having a softening point of 91.8° C. The properties of this resin (designated as "162-236") are reported in Table 1. Three other resins (designated as "162-237," "162-238," and "162-239") were prepared according to the procedures outlined in this Example, except for the changes in reactant ratios as noted in Table 1.

TABLE 1

SYNTHESIS OF RESORCINOL-STYRENE-BUTYRALDEHYDE RESINS

| | Resin Number | | | |
|---|---|---|---|---|
| | 162-236 | 162-237 | 162-238 | 162-239 |
| Raw Materials (MOLE) | | | | |
| Resorcinol | 1 | 1 | 1 | 1 |
| Styrene | 0.6 | 0.7 | 0.8 | 1 |
| Butyraldehyde | 0.65 | 0.65 | 0.65 | 0.55 |
| Resin Properties | | | | |
| Softening Point (° C.) | 91.8 | 95.7 | 90.7 | 75.2 |
| Free Resorcinol (wt. %) | 1.2 | 0.7 | 0.45 | 0.33 |

Resins 162-236 and 162-238 were used to prepare rubber compositions according to the procedures described above and the physical properties of the rubber compositions were evaluated accordingly. The results are reported in the Table 2. In Table 2, under rubber compound A, resorcinol was used as the methylene acceptor as control. "R/STY/B" stands for a resorcinol styrene butyraldehyde resin made in accordance with embodiments of the invention. The fuming test was a visual test on a scale of 0 to 3, during the second mixing stage. If there is absolutely no fuming, it is rated as "0". The fuming of resorcinol in the mixture is rated as "3".

TABLE 2

RUBBER COMPOUND PROPERTIES OF RESORCINOL/STYRENE/BUTYRALDEHYDE RESINS

| | Compound | | |
|---|---|---|---|
| | A | B 162-236 | C 162-238 |
| Methylene Acceptor | Resorcinol | R/STY/B | R/STY/B |
| Methylene Donor | HMMM | HMMM | HMMM |
| Weight Ratio; Acceptor/Donor, phr | 2.5/2.5 | 3.0/2.0 | 3.0/2.0 |
| Fuming at 120° C. | 3 | 0 | 0 |
| Mooney Viscosity (100° C.), ML 1 + 4 | 58.6 | 62.1 | 60.8 |
| Rheometer Cure at 150° C. | | | |
| M$_H$, dN-m | 39.7 | 33.2 | 31 |
| M$_L$, dN-m | 2.5 | 2.6 | 2.5 |
| t$_2$2, minutes | 3.3 | 4 | 4.1 |
| t' 90, minutes | 17.9 | 20 | 20.6 |
| Wire Adhesion, N (% Rubber Coverage) | | | |
| Unaged | 941(80) | 1007(80) | 1027(75) |
| Steam, 24 Hours at 120° C. | 1456(95) | 1422(95) | 1384(95) |
| Humidity, 21 Days, 85° C./95% RH | 1336(95) | 1170(95) | 1194(95) |
| Dynamic Mechanical | | | |
| G' at 0.2% Strain, Mpa | 23.12 | 23.15 | 23.51 |
| Tan Delta at 0.2% Strain | 0.076 | 0.081 | 0.081 |
| G' at 5% Strain, Mpa | 9.84 | 9.81 | 9.82 |

TABLE 2-continued

RUBBER COMPOUND PROPERTIES OF RESORCINOL/STYRENE/BUTYRALDEHYDE RESINS

| | Compound | | |
|---|---|---|---|
| | A | B 162-236 | C 162-238 |
| Tan Delta at 5% Strain | 0.244 | 0.247 | 0.252 |
| Shore A Hardness | 83 | 82 | 82 |
| Tensile Properties | | | |
| 100% Modulus, Mpa | 4.85 | 4.41 | 4.22 |
| Tensile Strength, Mpa | 26.6 | 26.7 | 26.6 |
| Elongation, % | 475 | 500 | 508 |
| Die-C Tear, KN/m | 108.1 | 118.1 | 122.2 |

EXAMPLE 4

Synthesis of Styrene Modified Resorcinol-Iso-Butyraldehyde Resin

Into a 500 mL reaction kettle equipped with a stirrer, thermometer, reflux condenser and an addition funnel, 110.1 grams (1.0 mole) of resorcinol were charged and heated to 120–130 ° C. p-Toluene sulfonic acid (1.0 gram) was then added at 120° C. and mixed for 5 minutes. Then 72.8 grams (0.7 mole) of styrene were added dropwise over a period of 60–120 minutes at 120–135 ° C. After all the styrene had been added, the reaction mixture was maintained at that temperature for an additional 30–60 minutes. After this, the temperature was raised to 150–155° C. and the contents were stirred for an additional 30 minutes to complete the resorcinol-styrene reaction. Then 43.2 grams (0.6 mole) of isobutyraldehyde were added slowly into the kettle for a period of 45–60 minutes at 90–120° C. The reaction mixture was held at reflux for 30–60 minutes more. After the reflux, 0.5 gram of 50% sodium hydroxide solution was added to neutralize the acid catalyst. Finally water distillate was removed under reduced pressure to obtain a resin having a softening point of 83.6° C. The properties of this resin (designated as "162-240") are reported in Table 3. Four other resins (designated as "162-241," "177-184," "177-197," and "177-189") were prepared according to the procedures outlined in this Example, except for the changes in reactant ratios as noted in Table 3.

TABLE 3

SYNTHESIS OF RESORCINOL-STYRENE-ISOBUTYRALDEHYDE RESINS

| | Resin Number | | | | |
|---|---|---|---|---|---|
| | 177-184 | 177-197 | 177-189 | 162-240 | 162-241 |
| RAW MATERIALS (MOLE) | | | | | |
| RESORCINOL | 1 | 1 | 1 | 1 | 1 |
| STYRENE | 0.7 | 0.75 | 0.65 | 0.7 | 1 |
| ISOBUTYRALDEHYDE | 0.65 | 0.65 | 0.67 | 0.6 | 0.55 |
| RESIN PROPERTIES | | | | | |
| SOFTENING POINT (° C.) | 96.5 | 82.9 | 86.4 | 83.6 | 65.8 |
| FREE RESORCINOL (wt. %) | 0.8 | 1.1 | 1.6 | 1.4 | 1 |

Resins 177-184, 177-187, and 177-189 were used as a methylene acceptor in rubber compositions prepared according to the procedures described above. The physical properties are measured accordingly and are reported in the Table 4. In Table 4, under rubber compound A, resorcinol was used as the methylene acceptor as control. "R/STY/ISO-B" stands for a resorcinol styrene isobutyraldehyde resin made in accordance with embodiments of the invention. Penacolite® B-20-S resin is available from Indspec Chemical Corporation, Pittsburgh, Pa., and is a styrene-modified resorcinol formaldehyde resin. Penacolite® B-20-S resin can be made according to the methods disclosed in U.S. Pat. Nos. 5,049,641 and 5,021,522, which are incorporated by reference herein in their entirety.

(0.7 mole) of styrene were added dropwise over a period of 60–120 minutes at 120–135° C. After all the styrene had been added, the reaction mixture was maintained at that temperature for an additional 30–60 minutes. After this, the temperature was raised to 150–155° C. and the contents were stirred for an additional 30 minutes to complete the resorcinol-styrene reaction. Then 14.4 grams (0.20 mole) of butyraldehyde were added slowly into the kettle for a period of 45–60 minutes at 90–120° C. The reaction mixture was held at reflux for 30–60 minutes more after the butyraldehyde addition. Then 37.0 grams (0.45 mole) of formaldehyde were added for a period of 30 minutes at reflux. After

TABLE 4

RUBBER COMPOUND PROPERTIES OF RESORCINOL-STYRENE-ISOBUTYRALDEHYDE RESINS

| | Compound | | | | |
|---|---|---|---|---|---|
| | A | B | C 177-184 | D 177-187 | E 177-189 |
| Methylene Acceptor | Resorcinol | PENACOLITE® RESIN B-20-S | R/STY/ISO-B | R/STY/ISO-B | R/STY/ISO-B |
| Methylene Donor | HMMM | HMMM | HMMM | HMMM | HMMM |
| Weight Ratio; Acceptor/Donor, phr | 2.5/2.5 | 3.0/2.0 | 3.0/2.0 | 3.0/2.0 | 3.0/2.0 |
| Fuming at 120° C. | 3 | 0.5 | 0.5 | 0.5 | 0.5 |
| Mooney Viscosity (100° C.), ML 1 + 4 | 58.2 | 65.2 | 60 | 58.4 | 59.4 |
| Rheometer Cure at 150° C. | | | | | |
| $M_H$, dN-m | 37.4 | 35.4 | 30.6 | 30.4 | 30.9 |
| $M_L$, dN-m | 2.4 | 2.9 | 2.3 | 2.3 | 2.4 |
| $t_s2$, minutes | 3.1 | 2.7 | 4.1 | 4.2 | 4.2 |
| t' 90, minutes | 15.8 | 17.7 | 19.3 | 19.9 | 19.5 |
| Wire Adhesion, N (% Rubber Coverage) | | | | | |
| Unaged | 1062(80) | 1180(85) | 972(65) | 1016(70) | 993(75) |
| Steam, 24 Hours at 120° C. | 1291(90) | 1340(90) | 1281(90) | 1227(90) | 1327(90) |
| Humidity, 21 Days, 85° C./95% RH | 1167(90) | 1209(90) | 1218(90) | 1181(90) | 1214(90) |
| Dynamic Mechanical | | | | | |
| G' at 0.2% Strain, Mpa | 23.04 | 26.54 | 25.14 | 24.99 | 24.66 |
| Tan Delta at 0.2% Strain | 0.079 | 0.074 | 0.08 | 0.077 | 0.08 |
| G' at 2% Strain, Mpa | 13.42 | 15.96 | 14.67 | 14.71 | 14.61 |
| Tan Delta at 2% Strain | 0.211 | 0.198 | 0.21 | 0.208 | 0.206 |
| Shore A Hardness | 83 | 84 | 81 | 82 | 83 |
| Tensile Properties | | | | | |
| 100% Modulus, Mpa | 5.14 | 4.62 | 4.21 | 4.42 | 4.31 |
| Tensile Strength, Mpa | 24.8 | 26.4 | 27 | 27.1 | 26.6 |
| Elongation, % | 408 | 455 | 462 | 497 | 490 |
| Die-C Tear, KN/m | 110.2 | 114.6 | 125.7 | 116.5 | 126.9 |

EXAMPLE 5

Synthesis of Styrene Modified Resorcinol-Butyraldehyde-Formaldehyde Resin

Into a 500 mL reaction kettle equipped with a stirrer, thermometer, reflux condenser and an addition funnel, 110.1 grams (1.0 mole) of resorcinol were charged and heated to 120–130° C. p-Toluene sulfonic acid (1.0 gram) was then added at 120° C. and mixed for 5 minutes. Then 72.8 grams refluxing the mix again for 15–30 minutes, 0.5 gram of 50% sodium hydroxide solution was added to neutralize the acid catalyst. Finally water distillate was removed under reduced pressure to obtain a resin having a softening point of 125.6° C. The properties of the resin (designated as "162-230") are reported in Table 5, along with a number of other resins which were prepared according to the procedures outlined in this Example, except for the changes in the reactant ratios as indicated in Table 5.

TABLE 5

Synthesis of Resorcinol-Styrene-Butyraldehyde-Formaldehyde Resins

| | Resin Number: | | | | | | | | |
|---|---|---|---|---|---|---|---|---|---|
| | 181-26 | 181-28 | 181-30 | 181-33 | 181-37 | 181-40 | 181-42 | 181-46 | 181-49 |
| Raw Materials (Mole) | | | | | | | | | |
| Resorcinol | 1 | 1 | 1 | 1 | 1 | 1 | 1 | 1 | 1 |
| Styrene | 0.55 | 0.55 | 0.55 | 0.55 | 0.55 | 0.6 | 0.6 | 0.55 | 0.65 |
| Butyraldehyde | 0.55 | 0.45 | 0.35 | 0.3 | 0.3 | 0.3 | 0.3 | 0.3 | 0.3 |
| Formaldehyde | 0.13 | 0.2 | 0.35 | 0.35 | 0.4 | 0.26 | 0.29 | 0.29 | 0.29 |
| Total Aldehyde | 0.68 | 0.65 | 0.7 | 0.65 | 0.7 | 0.56 | 0.59 | 0.59 | 0.59 |
| B/F ratio* | 4.23 | 2.25 | 1 | 0.857 | 0.75 | 1.15 | 1.03 | 1.03 | 1.03 |
| Resin Properties | | | | | | | | | |
| Softening Point (° C.) | 107.9 | 107.4 | 122.6 | 113.7 | 125 | 92.6 | 100.4 | 102.3 | 98.7 |
| Free Resorcinol (wt. %) | 0.98 | 1.4 | 0.77 | 1.3 | 0.8 | 2.2 | 1.4 | 1.8 | 1.3 |

| | Resin Number: | | | | | | | | |
|---|---|---|---|---|---|---|---|---|---|
| | 181-51 | 181-64 | 181-69 | 162-230 | 162-231 | 162-232 | 162-233 | 162-234 | 162-235 |
| Raw Materials (Mole) | | | | | | | | | |
| Resorcinol | 1 | 1 | 1 | 1 | 1 | 1 | 1 | 1 | 1 |
| Styrene | 0.65 | 0.6 | 0.65 | 0.7 | 0.7 | 0.7 | 0.8 | 0.9 | 1 |
| Butyraldehyde | 0.4 | 0.4 | 0.2 | 0.2 | 0.35 | 0.45 | 0.2 | 0.2 | 0.2 |
| Formaldehyde | 0.21 | 0.21 | 0.37 | 0.45 | 0.3 | 0.2 | 0.45 | 0.45 | 0.45 |
| Total Aldehyde | 0.61 | 0.61 | 0.57 | 0.65 | 0.65 | 0.65 | 0.65 | 0.65 | 0.65 |
| B/F ratio* | 1.90 | 1.90 | 0.54 | 0.44 | 1.16 | 2.25 | 0.44 | 0.44 | 0.44 |
| Resin Properties | | | | | | | | | |
| Softening Point (° C.) | 99.6 | 99 | | 125.6 | 110.9 | 105.3 | 108.4 | 110.5 | 107 |
| Free Resorcinol (wt. %) | 1.1 | 1.6 | | 0.3 | 0.5 | 0.6 | 0.4 | 0.2 | 0.2 |

*It stands for Butyraldehyde to Formaldehyde Ratio.

Resins 162-231, 162-232, 162-233, 162-235, 181-51, and 181-28 were used as a methylene acceptor in rubber compositions prepared according to the procedures described above. The physical properties were measured and are reported in Tables 6 and 7.

TABLE 6

RUBBER COMPOUND PROPERTIES OF RESORCINOL/STYRENE/BUTYRALDEHYDE/FORMALDEHYDE RESINS

| | Compound | | | | |
|---|---|---|---|---|---|
| | A | B 162-231 | C 162-232 | D 162-233 | E 162-235 |
| Methylene Acceptor | Resorcinol | R/STY/B/F | R/STY/B/F | R/STY/B/F | R/STY/B/F |
| Methylene Donor | HMMM | HMMM | HMMM | HMMM | HMMM |
| Weight Ratio; Acceptor/Donor, phr | 2.5/2.5 | 3.0/2.0 | 3.0/2.0 | 3.0/2.0 | 3.0/2.0 |
| Fuming at 120° C. | 3 | 0 | 0 | 0 | 0 |
| Mooney Viscosity (100° C.), ML 1 + 4 | 58.7 | 62.5 | 61.4 | 62.6 | 62 |
| Rheometer Cure at 150° C. | | | | | |
| $M_H$, dN-m | 40 | 32.9 | 32.4 | 32.7 | 30.2 |
| $M_L$, dN-m | 2.5 | 2.7 | 2.6 | 2.8 | 2.7 |
| $t_s2$, minutes | 3.3 | 3.5 | 3.8 | 3.5 | 3.9 |
| t' 90, minutes | 18.1 | 20 | 20.2 | 19.7 | 20.8 |
| Wire Adhesion. N (% Rubber Coverage) | | | | | |
| Unaged | 948(80) | 1065(80) | 993(70) | 1063(80) | 1077(70) |
| Steam, 24 Hours at 120° C. | 1424(95) | 1418(95) | 1438(95) | 1405(95) | 1413(95) |
| Humidity, 21 Days, 85° C./95% RH | 1329(95) | 1202(90) | 1209(90) | 1300(85) | 1213(85) |
| Dynamic Mechanical | | | | | |
| G' at 0.2% Strain, Mpa | 23.18 | 24.68 | 24.7 | 24.87 | 24.33 |
| Tan Delta at 0.2% Strain | 0.08 | 0.082 | 0.082 | 0.081 | 0.081 |
| G' at 2% Strain, Mpa | 13.72 | 15 | 15.07 | 15.21 | 14.68 |
| Tan Delta at 2% Strain | 0.21 | 0.204 | 0.203 | 0.201 | 0.207 |
| Shore A Hardness | 82 | 82 | 83 | 84 | 81 |
| Tensile Properties | | | | | |
| 100% Modulus, Mpa | 5.16 | 4.2 | 4.24 | 4.09 | 4.17 |
| Tensile Strength, Mpa | 25.7 | 26.6 | 26.8 | 26.9 | 26.9 |
| Elongation, % | 437 | 504 | 503 | 508 | 509 |
| Die-C Tear, KN/m | 106.5 | 118.8 | 121.9 | 113.3 | 118.9 |
| 1" Stock-Stock Adhesion, N/M | 17294 | 23449 | 20725 | 22566 | 23626 |

TABLE 7

RUBBER COMPOUND PROPERTIES OF RESORCINOL/STYRENE/BUTYRALDEHYDE/FORMALDEHYDE RESINS

| | Compound | | |
|---|---|---|---|
| | A | B 181-51 | C 181-28 |
| Methylene Acceptor | RESORCINOL | R/STY/B/F | R/STY/B/F |
| Methylene Donor | HMMM | HMMM | HMMM |
| Weight Ratio; Acceptor/Donor, phr | 2.5/2.5 | 3.0/2.0 | 3.0/2.0 |
| Fuming at 120° C. | 3 | 0.5 | 0.5 |
| Mooney Viscosity (100° C.) ML 1 + 4 | 57 | 60 | 61 |
| Rheometer Cure at 150° C. | | | |
| $M_H$, dN-m | 35.93 | 33.12 | 33.31 |
| $M_L$, dN-m | 2.26 | 2.49 | 2.56 |
| $t_s2$, minutes | 3.28 | 3.68 | 3.55 |
| t' 90, minutes | 16.89 | 19.42 | 19.31 |
| Wire Adhesion, N (% Rubber Coverage) | | | |
| Unaged | 1027(85) | 986(80) | 978(85) |
| Steam, 24 Hours at 120° C. | 1247(90) | 1405(95) | 1349(95) |
| Humidity, 21 Days, 85° C./95% RH | 1180(90) | 1152(90) | 1181(90) |
| Dynamic Mechanical | | | |
| G' at 0.2% Strain, Mpa | 22.56 | 25.37 | 25.24 |
| Tan Delta at 0.2% Strain | 0.07 | 0.073 | 0.073 |
| G' at 2% Strain, Mpa | 13.76 | 15.61 | 15.6 |
| Tan Delta at 2% Strain | 0.193 | 0.193 | 0.191 |
| Shore A Hardness | 81 | 84 | 82 |

TABLE 7-continued

RUBBER COMPOUND PROPERTIES OF RESORCINOL/STYRENE/BUTYRALDEHYDE/FORMALDEHYDE RESINS

| | Compound | | |
|---|---|---|---|
| | A | B 181-51 | C 181-28 |
| Tensile Properties | | | |
| 100% Modulus, Mpa | 5.02 | 4.18 | 4.28 |
| Tensile Strength, Mpa | 25.7 | 25.2 | 25.8 |
| Elongation, % | 453 | 480 | 493 |
| Energy to Break, N-m | 23.6 | 24.14 | 25.84 |
| Die-C Tear, KN/m | 107 | 110 | 116 |
| Energy to Peak Load, N-m | 17.5 | 20.8 | 22.3 |

EXAMPLE 7

Synthesis of Styrene Modified Resorcinol-Valeraldehyde-Formaldehyde Resin

Into a 500 mL reaction kettle equipped with a stirrer, thermometer, reflux condenser and an addition funnel, 110.1 grams (1.0 mole) of resorcinol were charged and heated to 120–130° C. p-Toluene sulfonic acid (1.0 gram) was then added at 120° C. and mixed for 5 minutes. Then 72.8 grams (0.7 mole) of styrene were added dropwise over a period of 60–120 minutes at 120–135° C. After all the styrene had been added, the reaction mixture was maintained at that temperature for an additional 30–60 minutes. After this, the temperature was raised to 150–155° C. and the contents were stirred for an additional 30 minutes to complete the resorcinol-styrene reaction. Then 25.8 grams (0.30 mole) of valeraldehyde were added slowly into the kettle for a period of 45–60 minutes at 90–120° C. The reaction mixture was held at reflux for 30–60 minutes more after the valeraldehyde addition. Then 8.7 grams (0.29 mole) of formaldehyde were added for a period of 30 minutes at reflux. After refluxing the mix again for 15–30 minutes, 0.5 gram of 50% sodium hydroxide solution was added to neutralize the acid catalyst. Finally water distillate was removed under reduced pressure to obtain a resin having a softening point of 96.6° C. The properties of the resin (designated as "181-74") are reported in Table 8, along with another resin (designated as "181-71") which was prepared according to the procedures outlined in this Example, except for the changes in the reactant ratios as indicated in Table 8.

TABLE 8

SYNTHESIS OF RESORCINOL-STYRENE-VALERALDEHYDE-FORMALDEHYE RESINS

| | Resin Number | |
|---|---|---|
| | 181-71 | 181-74 |
| RAW MATERIALS (MOLE) | | |
| RESORCINOL | 1 | 1 |
| STYRENE | 0.7 | 0.7 |
| VALERALDEHYDE | 0.65 | 0.3 |
| FORMALDEHYDE | 0 | 0.29 |

TABLE 8-continued

SYNTHESIS OF RESORCINOL-STYRENE-VALERALDEHYDE-FORMALDEHYE RESINS

| | Resin Number | |
|---|---|---|
| | 181-71 | 181-74 |
| RESIN PROPERTIES | | |
| SOFTENING POINT (° C.) | 88.9 | 96.6 |
| FREE RESORCINOL (wt. %) | 0.47 | 0.93 |

As demonstrated above, embodiments of the invention provide a modified resorcinol resin for use in rubber compounding. The modified resorcinol resin has lower softening points and therefore would enhance the processability of the uncured rubber compositions which incorporate the resin. However, the improved processability does not compromise other performance properties. For example, the adhesion properties, dynamic mechanical properties, tear properties of the uncured rubber composition are comparable or better than existing resorcinol-based resins. Accordingly, use of the modified resorcinol resin in rubber compounding should yield better rubber products.

While the invention has been described with respect to a limited number of embodiments, the specific features of one embodiment should not be attributed to other embodiments of the invention. No single embodiment is representative of all aspects of the inventions. In some embodiments, the compositions may include numerous compounds not mentioned herein. In other embodiments, the compositions do not include, or are substantially free of, any compounds not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

The invention claimed is:

1. A modified resorcinol resin prepared by a process comprising reacting a phenolic compound with (1) an olefinically unsaturated compound selected from the group consisting of styrene, α-methyl styrene, p-methyl styrene, α-chloro styrene, divinyl benzene, vinyl naphthalene, indene, and vinyl toluene, and (2) formaldehyde and (3) with an alkyl aldehyde having at least 4 carbon atoms, wherein the molar ratio of the phenolic compound to the formaldehyde is from about 1:0.2 to about 1:0.4, the molar ratio of the phenolic compound to the alkyl aldehyde is from about 1:0.1 to about 1:0.45, and the molar ratio of the alkyl aldehyde to formaldehyde is from about 0.5:1 to about 2:1 and wherein the modified resorcinol resin has a softening point between 80° C. and 150° C.

2. The modified resorcinol resin of claim 1, wherein the phenolic compound is represented by formula (1)

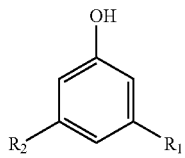

(1)

wherein $R_1$ and $R_2$ are independently selected from the group consisting of H, OH, $NH_2$, alkyl of 1–12 carbon atoms, $OCOR_3$ or $OR_3$ where $R_3$ is an alkyl or aryl group of 1–12 carbon atoms.

3. The modified resorcinol resin of claim 1, wherein the molar ratio of the phenolic compound to the olefinically unsaturated compound is from about 1:0.65 to about 1:0.55.

4. The modified resorcinol resin of claim 1, wherein the molar ratio of the alkyl aldehyde to formaldehyde is from about 0.9:1 to about 1.5:1.

5. The modified resorcinol resin of claim 1, wherein the molar ratio of the alkyl aldehyde to formaldehyde is from about 1:1 to about 1.2:1.

6. The modified resorcinol resin of claim 1, wherein the phenolic compound is a resorcinol.

7. The modified resorcinol resin of claim 1, wherein the olefinically unsaturated compound is a styrene.

8. The modified resorcinol resin of claim 1, wherein the alkyl aldehyde is a n-butyraldehyde or isobutyraldehyde.

9. A modified resorcinol resin prepared by a process comprising reacting a phenolic compound with (1) an olefinically unsaturated compound selected from the group consisting of styrene, α-methyl styrene, p-methyl styrene, α-chloro styrene, divinyl benzene, vinyl naphthalene, indene, and vinyl toluene, and (2) formaldehyde and (3) with an alkyl aldehyde selected from valeraldehyde, lauryl aldehyde, palmityl aldehyde, or stearyl aldehyde,
wherein the molar ratio of the phenolic compound to the formaldehyde is from about 1:0.2 to about 1:0.4, the molar ratio of the phenolic compound to the alkyl aldehyde is from about 1:0.2 to about 1:0.45, and the molar ratio of the alkyl aldehyde to formaldehyde is from about 0.5:1 to about 2:1.

10. The modified resorcinol resin of claim 6, wherein the resorcinol resin has a free resorcinol content of less than 5 weight percent.

11. The modified resorcinol resin of claim 6, wherein the resorcinol resin has a softening point between about 900° C. and about 105° C.

12. The modified resorcinol resin of claim 1, wherein the resin is prepared by reacting resorcinol, styrene, formaldehyde and butyraldehyde, wherein the molar ratio of resorcinol to styrene is from about 1:0.65 to about 1:0.60, the molar ratio of resorcinol to formaldehyde is from about 1:0.4 to about 1:0.2, the molar ratio of resorcinol to butyraldehyde is from about 1:0.45 to about 1:0.2, and the molar ratio of butyraldehyde to formaldehyde is from about 0.9:1 to about 1.2:1.

13. A vulcanizable rubber composition, comprising (I) a rubber component selected from natural rubber, synthetic rubber or combinations thereof, (II) a methylene donor compound which generates formaldehyde upon heating, and (III) a methylene acceptor compound comprising the modified resorcinol resin of claim 1.

14. The vulcanizable rubber composition of claim 13, wherein the methylene donor is selected from the group consisting of hexamethylenetetramine, methylol melamines, etherified methylol melamines and esterified methylol melamines.

15. A process for making a modified resorcinol resin, comprising:
reacting a phenolic compound with (1) an olefinically unsaturated compound selected from the group consisting of styrene, α-methyl styrene, p-methyl styrene, α-chloro styrene, divinyl benzene, vinyl naphthalene, indene, and vinyl toluene, and (2) formaldehyde and (3) an alkyl aldehyde having at least 4 carbon atoms,
wherein the molar ratio of the phenolic compound to the formaldehyde is from about 1:0.2 to about 1:0.4, the molar ratio of the phenolic compound to the alkyl aldehyde is from about 1:0.1 to about 1:0.45, and the molar ratio of the alkyl aldehyde to formaldehyde is from about 0.5:1 to about 2:1 and wherein the modified resorcinol resin has a softening point between 80° C. and 150° C.

16. The process of claim 15, wherein the phenolic compound represented by formula (1)

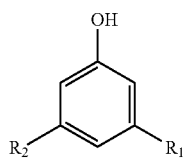

(1)

wherein $R_1$ and $R_2$ are independently selected from the group consisting of H, OH, $NH_2$, alkyl of 1–12 carbon atoms, $OCOR_3$ or $OR_3$ where $R_3$ is an alkyl or aryl group of 1–12 carbon atoms.

17. The process of claim 15, wherein the molar ratio of the phenolic compound to the olefinically unsaturated compound is from about 1:0.65 to about 1:0.55.

18. The process of claim 15, wherein the molar ratio of the alkyl aldehyde to formaldehyde is from about 0.9:1 to about 1.5:1.

19. The process of claim 15, wherein the molar ratio of the alkyl aldehyde to formaldehyde is from about 1:1 to about 1.2:1.

20. The process of claim 15, wherein the phenolic compound is a resorcinol.

21. The process of claim 15, wherein the olefinically unsaturated compound is a styrene.

22. The process of claim 15, wherein the alkyl aldehyde is a n-butyraldehyde or isobutyraldehyde.

23. A process for making a modified resorcinol resin, comprising:
reacting a phenolic compound with (1) an olefinically unsaturated compound selected from the group consisting of styrene, α-methyl styrene, p-methyl styrene, α-chloro styrene, divinyl benzene, vinyl naphthalene, indene, and vinyl toluene, and (2) formaldehyde and (3) an alkyl aldehyde selected from valeraldehyde, lauryl aldehyde, palmityl aldehyde, or stearyl aldehyde,
wherein the molar ratio of the phenolic compound to the formaldehyde is from about 1:0.2 to about 1:0.4, the molar ratio of the phenolic compound to the alkyl aldehyde is from about 1:0.2 to about 1:0.45, and the molar ratio of the alkyl aldehyde to formaldehyde is from about 0.5:1 to about 2:1.

24. The process of claim 20, wherein the resorcinol resin has a free resorcinol content of less than 5 weight percent.

25. The process of claim 20, wherein the resorcinol resin has a softening point between about 900° C. and about 105° C.

26. The process of claim 15, wherein the resin is prepared by reacting resorcinol, styrene, formaldehyde and butyraldehyde, wherein the molar ratio of resorcinol to styrene is from about 1:0.65 to about 1:0.60, the molar ratio of resorcinol to formaldehyde is from about 1:0.4 to about 1:0.2, the molar ratio of resorcinol to butyraldehyde is from about 1:0.45 to about 1:0.2, and the molar ratio of butyraldehyde to formaldehyde is from about 0.9:1 to about 1.2:1.

27. The process of claim 15, wherein the reaction occurs in the presence of an acid catalyst.

28. The process of claim 27, wherein the acid catalyst is selected from the group consisting of benzene sulfonic acid, benzene disulfonic acid, p-toluene sulfonic acid; xylene sulfonic acid, and methane sulfonic acid.

29. A resorcinol resin comprising a structure represented by the following formula:

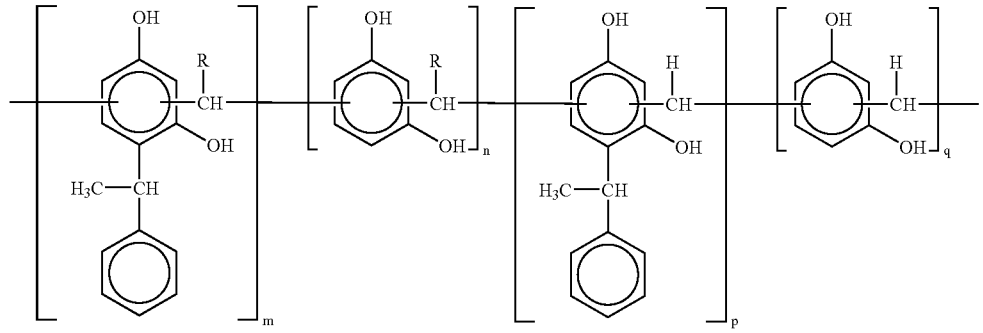

wherein R is an alkyl, aryl, or aralkyl having at least 3 carbon atoms; m and n are independently a positive integer, p and q are independently zero or a positive integer, where the sum of m, n, p, and q is at least 3.

30. The resorcinol resin of claim 29, wherein (m+n)/(p+q) is between about 0.5:1 and about 2:1.

31. The resorcinol resin of claim 29, wherein m and n independently range from about 1 to about 100.

32. The resorcinol resin of claim 29, wherein p and q independently range from about 1 to 50.

33. The resorcinol resin of claim 29, wherein R is propyl or isopropyl.

34. The resorcinol resin of claim 29, wherein R is an aliphatic alkyl having at least 4 carbon atoms.

35. A vulcanizable rubber composition, comprising (I) a rubber component selected from natural rubber, synthetic rubber or combinations thereof, (II) a methylene donor compound which generates formaldehyde upon heating, and (III) a methylene acceptor compound comprising the modified resorcinol resin of claim 29.

36. The modified resorcinol resin of claim 1, wherein the molar ratio of the phenolic compound to the alkyl aldehyde is from about 1:0.2 to about 1:0.45.

37. The process of claim 15, wherein the molar ratio of the phenolic compound to the alkyl aldehyde is from about 1:0.2 to about 1:0.45.

38. A modified resorcinol resin prepared by a process comprising reacting a phenolic compound with (1) an olefinically unsaturated compound selected from the group consisting of styrene, α-methyl styrene, p-methyl styrene, α-chloro styrene, divinyl benzene, vinylnaphthalene, indene, and vinyl toluene, and (2) formaldehyde and (3) with an alkyl aldehyde having at least 4 carbon atoms, wherein the molar ratio of the phenolic compound to the formaldehyde is from about 1:0.2 to about 1:0.4, the molar ratio of the phenolic compound to the alkyl aldehyde is from about 1:0.1 to about 1:0.45, and the molar ratio of the alkyl aldehyde to formaldehyde is from about 0.5:1 to about 2:1 and wherein the phenolic compound is represented by formula (1)

wherein $R_1$ is OH; and $R_2$ is H or $C_{1-10}$ alkyl.

39. The modified resorcinol resin of claim 38, wherein the molar ratio of the phenolic compound to the olefinically unsaturated compound is from about 1:0.65 to about 1:0.55.

40. The modified resorcinol resin of claim 38, wherein the molar ratio of the alkyl aldehyde to formaldehyde is from about 0.9:1 to about 1.5:1.

41. The modified resorcinol resin of claim 38, wherein the molar ratio of the alkyl aldehyde to formaldehyde is from about 1:1 to about 1.2:1.

42. The modified resorcinol resin of claim 38, wherein the phenolic compound is a resorcinol.

43. The modified resorcinol resin of claim 38, wherein the olefinically unsaturated compound is a styrene.

44. The modified resorcinol resin of claim 38, wherein the alkyl aldehyde is a n-butyraldehyde or isobutyraldehyde.

45. A vulcanizable rubber composition, comprising (I) a rubber component selected from natural rubber, synthetic rubber or combinations thereof, (II) a methylene donor compound which generates formaldehyde upon heating, and (III) a methylene acceptor compound comprising the modified resorcinol resin of claim 38.

46. The vulcanizable rubber composition of claim 45, wherein the methylene donor is selected from the group consisting of hexamethylenetetramine, methylol melamines, etherified methylol melamines and esterified methylol melamines.

47. A process for making a modified resorcinol resin, comprising:
reacting a phenolic compound with (1) an olefinically unsaturated compound selected from the group consisting of styrene, α-methyl styrene, p-methyl styrene, α-chloro styrene, divinyl benzene, vinyl naphthalene, indene, and vinyl toluene, and (2) formaldehyde and (3) an alkyl aldehyde having at least 4 carbon atoms,
wherein the molar ratio of the phenolic compound to the formaldehyde is from about 1:0.2 to about 1:0.4, the molar ratio of the phenolic compound to the alkyl aldehyde is from about 1:0.1 to about 1:0.45, and the molar ratio of the alkyl aldehyde to formaldehyde is from about 0.5:1 to about 2:1 and wherein the phenolic compound is represented by formula (1)

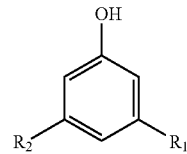

(1)

wherein $R_1$ is OH; and $R_2$ is H or $C_{1-10}$ alkyl.

48. The process of claim 47, wherein the molar ratio of the phenolic compound to the olefinically unsaturated compound is from about 1:0.65 to about 1:0.55.

49. The process of claim 47, wherein the molar ratio of the alkyl aldehyde to formaldehyde is from about 0.9:1 to about 1.5:1.

50. The process of claim 47, wherein the molar ratio of the alkyl aldehyde to formaldehyde is from about 1:1 to about 1.2:1.

51. The process of claim 47, wherein the phenolic compound is a resorcinol.

52. The process of claim 47, wherein the olefinically unsaturated compound is a styrene.

53. The process of claim 47, wherein the alkyl aldehyde is a n-butyraldehyde or isobutyraldehyde.

54. The process of claim 47, wherein the reaction occurs in the presence of an acid catalyst.

55. The process of claim 54, wherein the acid catalyst is selected from the group consisting of benzene sulfonic acid, benzene disulfonic acid, p-toluene sulfonic acid; xylene sulfonic acid, and methane sulfonic acid.

* * * * *